(12) United States Patent
Sakaki

(10) Patent No.: US 11,477,375 B2
(45) Date of Patent: *Oct. 18, 2022

(54) CONTROL DEVICE, CAMERA SYSTEM, AND PROGRAM

(71) Applicant: SONY CORPORATION, Tokyo (JP)

(72) Inventor: Kazunori Sakaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,435

(22) Filed: Sep. 1, 2020

(65) Prior Publication Data

US 2020/0404176 A1 Dec. 24, 2020

Related U.S. Application Data

(63) Continuation of application No. 13/320,550, filed as application No. PCT/JP2010/059248 on Jun. 1, 2010, now Pat. No. 10,798,280.

(30) Foreign Application Priority Data

Jun. 9, 2009 (JP) .............................. JP2009-138594

(51) Int. Cl.
*H04N 5/232* (2006.01)
*G08B 13/196* (2006.01)
(Continued)

(52) U.S. Cl.
CPC ... *H04N 5/23238* (2013.01); *G08B 13/19691* (2013.01); *G03B 37/00* (2013.01);
(Continued)

(58) Field of Classification Search
CPC .. H04N 5/23238; H04N 5/247; H04N 5/2628; H04N 5/23206; H04N 5/2258;
(Continued)

(56) References Cited

U.S. PATENT DOCUMENTS 5,359,363 A 10/1994 Kuban et al.
6,037,936 A 3/2000 Ellenby et al.
(Continued)

FOREIGN PATENT DOCUMENTS

CN 1909602 A 2/2007
JP 6-189180 7/1994
(Continued)

OTHER PUBLICATIONS

International Search Report dated Jul. 6, 2010, in PCT/JP2010/059248, filed Jun. 1, 2010.
(Continued)

*Primary Examiner* — Daniel Chang
(74) *Attorney, Agent, or Firm* — Oblon, McClelland, Maier & Neustadt, L.L.P.

(57) ABSTRACT

A control device including a processing circuit and a control circuit is provided. The processing circuit is configured to generate a birds-eye view image from a plurality of captured images. Each captured image of the plurality of captured images is in a different viewing direction. The control circuit is configured to receive a first selection input to select one of a wide-view image and the birds-eye view image, and to control display in a monitoring process, based on the first selection input, of the wide-view image, the birds-eye view image, and a first captured image different from the wide-view image and the birds-eye view image. The control circuit is configured to control display in the monitoring process, based on a second selection input, of the wide-view image, the birds-eye view image, and the first captured image.

16 Claims, 22 Drawing Sheets

(51) Int. Cl.
| | | |
|---|---|---|
| G03B 37/00 | (2021.01) | |
| H04N 19/167 | (2014.01) | |
| G06F 3/00 | (2006.01) | |
| G06K 9/00 | (2022.01) | |
| G06T 3/40 | (2006.01) | |

(52) U.S. Cl.
CPC .................. *G06F 3/00* (2013.01); *G06K 9/00* (2013.01); *G06T 3/4038* (2013.01); *H04N 19/167* (2014.11)

(58) Field of Classification Search
CPC ............... H04N 5/23216; H04N 7/181; H04N 5/23299; H04N 5/23293; H04N 5/23296; H04N 5/232933; H04N 5/232945; H04N 21/21805; H04N 5/2259; H04N 5/2254; H04N 21/4728; H04N 21/6587; G06T 3/4038; G06T 3/0062; G06T 2207/10016; G06T 3/0018; G06T 3/0093
See application file for complete search history.

(56) References Cited

U.S. PATENT DOCUMENTS

| | | | |
|---|---|---|---|
| 6,044,181 A | 3/2000 | Szeliski et al. | |
| 6,769,131 B1 | 7/2004 | Tanaka et al. | |
| 6,977,676 B1* | 12/2005 | Sato | H04N 5/23206 |
| | | | 348/211.11 |
| 7,206,017 B1 | 4/2007 | Suzuki | |
| 7,301,557 B2 | 11/2007 | Kakou et al. | |
| 8,035,680 B2 | 10/2011 | Mader et al. | |
| 2001/0010546 A1* | 8/2001 | Chen | H04N 5/232933 |
| | | | 348/E13.064 |
| 2001/0019355 A1 | 9/2001 | Koyanagi et al. | |
| 2001/0024233 A1 | 9/2001 | Urisaka et al. | |
| 2002/0122113 A1* | 9/2002 | Foote | G06T 7/33 |
| | | | 348/48 |
| 2002/0126318 A1 | 9/2002 | Katayama | |
| 2002/0154173 A1 | 10/2002 | Etgen et al. | |
| 2003/0025803 A1* | 2/2003 | Nakamura | H04N 5/23203 |
| | | | 348/218.1 |
| 2003/0071891 A1 | 4/2003 | Geng | |
| 2003/0160863 A1 | 8/2003 | Kakou et al. | |
| 2003/0160868 A1 | 8/2003 | Kakou et al. | |
| 2004/0017386 A1* | 1/2004 | Liu | H04N 7/15 |
| | | | 345/647 |
| 2004/0257436 A1 | 12/2004 | Koyanagi et al. | |
| 2005/0099494 A1* | 5/2005 | Deng | H04N 1/2112 |
| | | | 348/36 |
| 2006/0023105 A1* | 2/2006 | Kostrzewski | H04N 5/23238 |
| | | | 348/335 |
| 2006/0028550 A1 | 2/2006 | Palmer, Jr. et al. | |
| 2006/0125921 A1 | 6/2006 | Foote | |
| 2006/0187305 A1 | 8/2006 | Trivedi et al. | |
| 2006/0195876 A1* | 8/2006 | Calisa | H04N 7/181 |
| | | | 725/105 |
| 2006/0268103 A1 | 11/2006 | Kweon et al. | |
| 2007/0030341 A1* | 2/2007 | Morimoto | H04N 5/232939 |
| | | | 348/207.99 |
| 2007/0182812 A1* | 8/2007 | Ritchey | H04N 21/4305 |
| | | | 348/36 |
| 2007/0241911 A1 | 10/2007 | Swan et al. | |
| 2007/0273758 A1 | 11/2007 | Mendoza et al. | |
| 2008/0049099 A1 | 2/2008 | Shih et al. | |
| 2008/0062168 A1 | 3/2008 | Poullier et al. | |
| 2008/0062250 A1* | 3/2008 | Rye | H04N 5/23238 |
| | | | 348/14.01 |
| 2008/0111831 A1 | 5/2008 | Son et al. | |
| 2008/0118180 A1 | 5/2008 | Kamiya et al. | |
| 2008/0218587 A1 | 9/2008 | Glatt | |
| 2009/0021576 A1* | 1/2009 | Linder | H04N 5/2624 |
| | | | 348/222.1 |
| 2009/0073254 A1 | 3/2009 | Li et al. | |
| 2009/0115841 A1* | 5/2009 | Koyanagi | H04N 5/23296 |
| | | | 348/36 |
| 2009/0290024 A1* | 11/2009 | Larson | H04N 1/00188 |
| | | | 709/217 |
| 2010/0045773 A1* | 2/2010 | Ritchey | H04N 5/23238 |
| | | | 348/E7.001 |
| 2010/0265313 A1* | 10/2010 | Liu | H04N 5/23238 |
| | | | 348/E7.001 |
| 2011/0141227 A1* | 6/2011 | Bigioi | G06T 7/593 |
| | | | 348/36 |
| 2011/0273570 A1 | 11/2011 | Sakaki | |
| 2011/0273579 A1 | 11/2011 | Sakaki | |
| 2012/0062732 A1 | 3/2012 | Marman et al. | |
| 2012/0093365 A1 | 4/2012 | Aragane et al. | |

FOREIGN PATENT DOCUMENTS

| | | |
|---|---|---|
| JP | 2001-148850 A | 5/2001 |
| JP | 2002-034032 A | 1/2002 |
| JP | 2005-148265 | 6/2005 |
| JP | 2006-211105 A | 8/2006 |
| JP | 2007-043505 A | 2/2007 |
| JP | 2008-028778 A | 2/2008 |
| JP | 2008-301191 A | 12/2008 |
| KR | 10-2009-0107859 A | 10/2009 |

OTHER PUBLICATIONS

Office Action dated May 1, 2012, in Japanese Patent Application No. 2009-138594.

Extended European Search Report dated Oct. 30, 2012, in Application No. / Patent No. 10786089.2-2202 / 2442548 PCT/JP2010059248.

Combined Chinese Office Action and Search Report dated Nov. 15, 2013, in Chinese Patent Application No. 201080024248.1 (with English-language translation).

Office Action dated Jan. 22, 2013, in Japanese Patent Application No. 2009-138594.

European Office Action dated Mar. 13, 2015, in Patent Application No. 10 786 089.2.

Office Action dated Feb. 17, 2016, in Korean Patent Application No. 10-2011-7028827 (with English-language translation).

Extended European Search Report dated Jun. 19, 2018, in Patent Application No. 18166839.3.

* cited by examiner

FIG.2
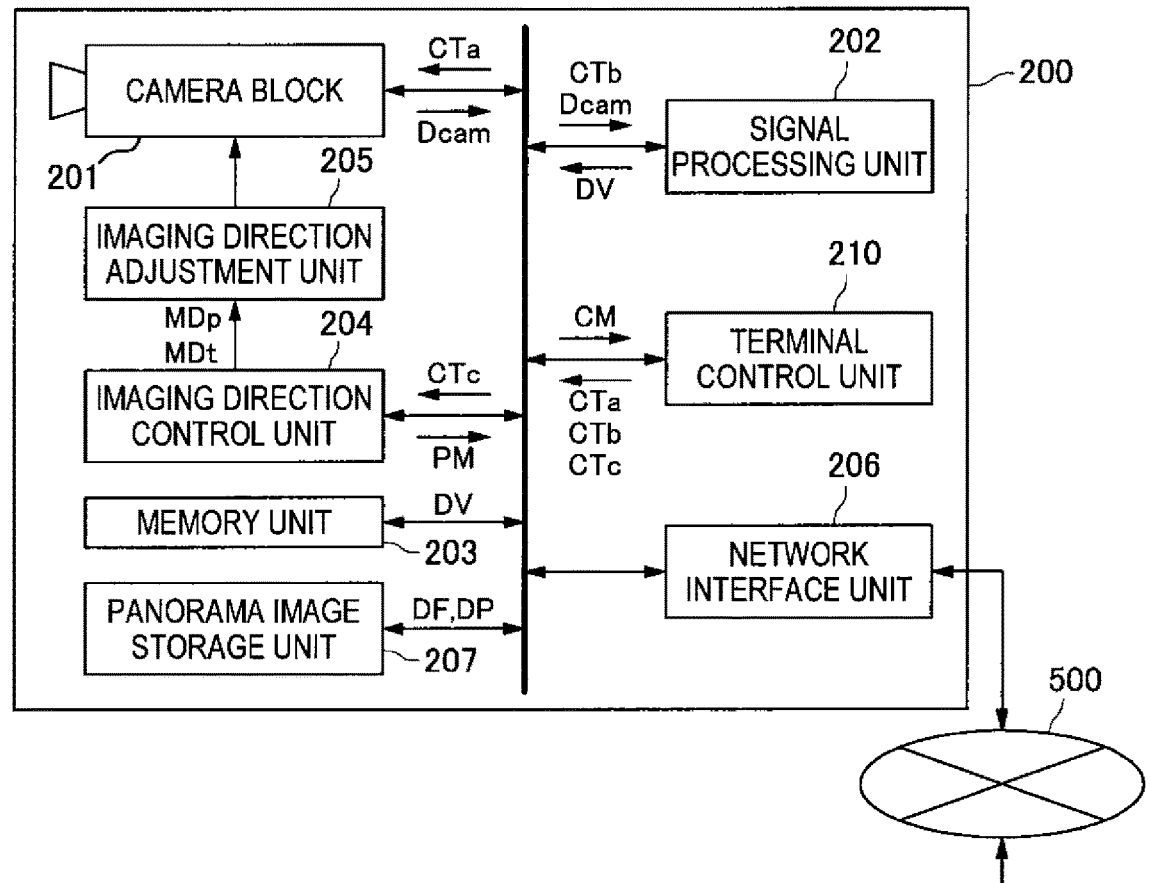
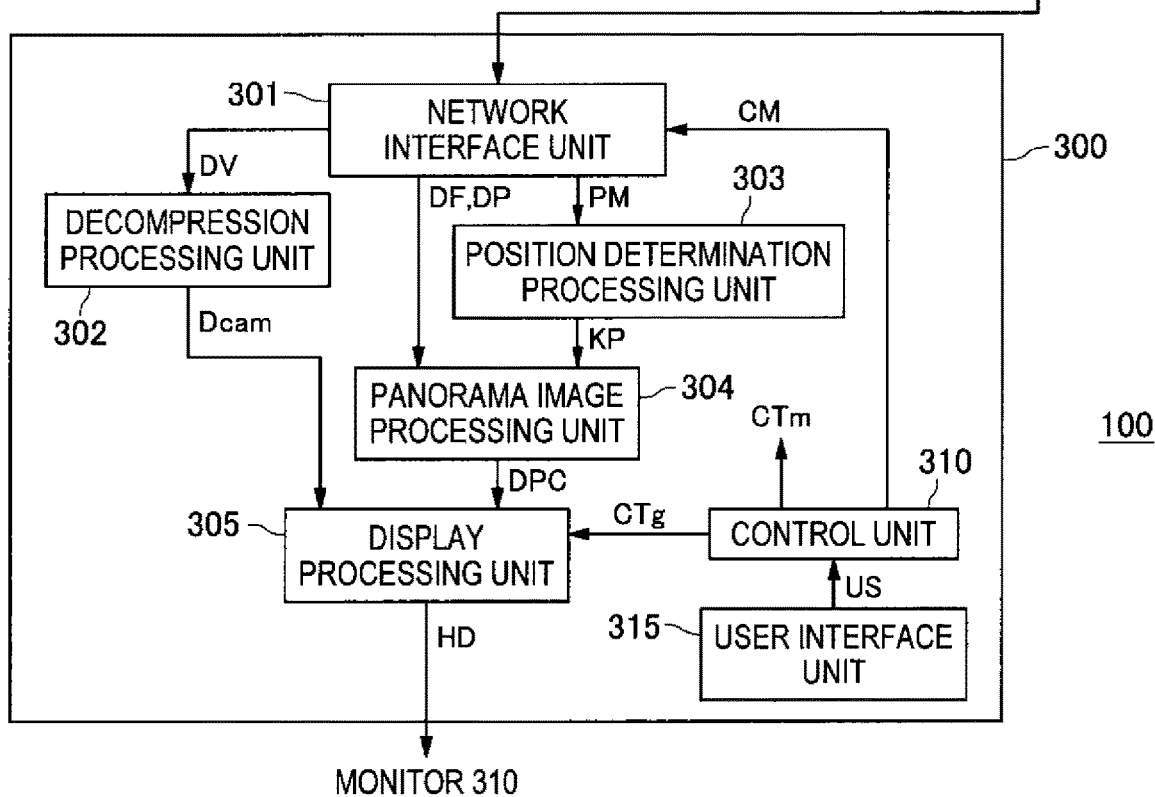

TYPICAL PAN/TILT CAMERA
360° ENDLESS PAN ROTATION

TILT 90°

CAMERA OF THIS EMBODIMENT
360° ENDLESS PAN ROTATION

TILT 220°

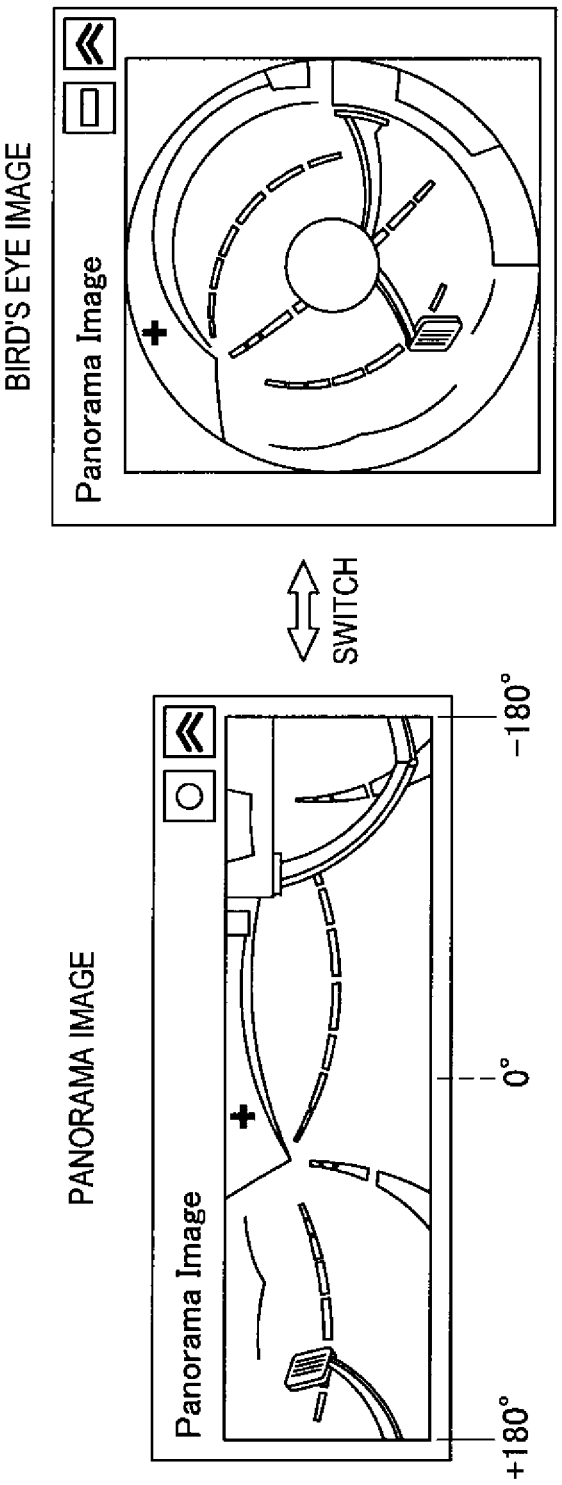

FIG.6
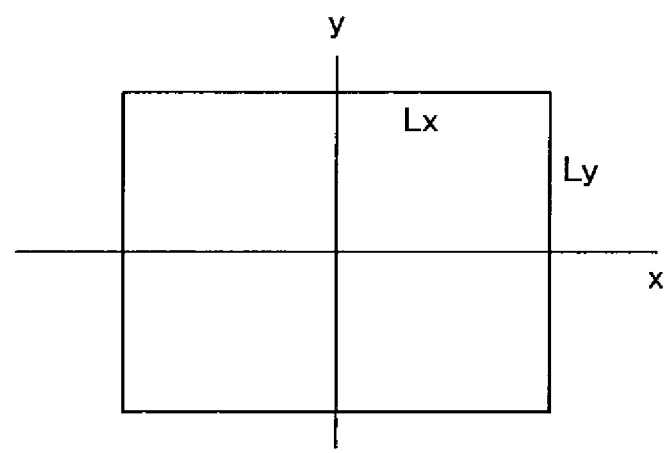
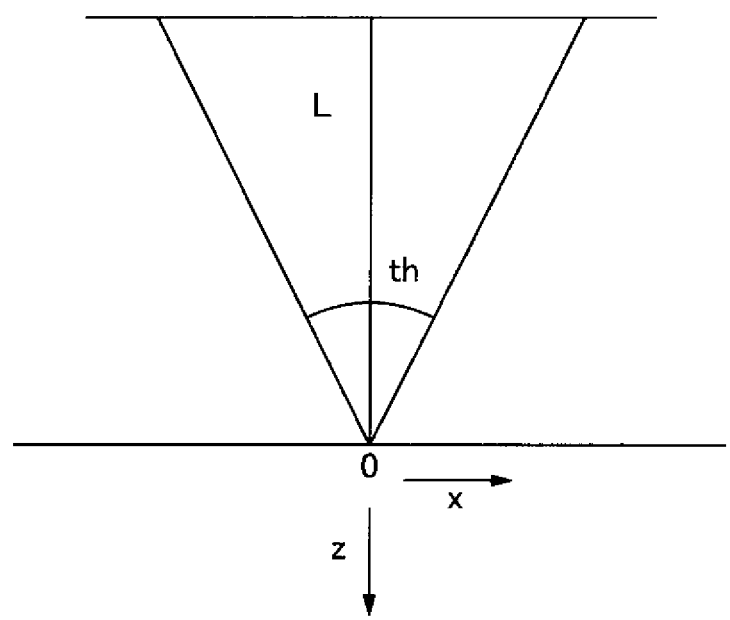

FIG.9
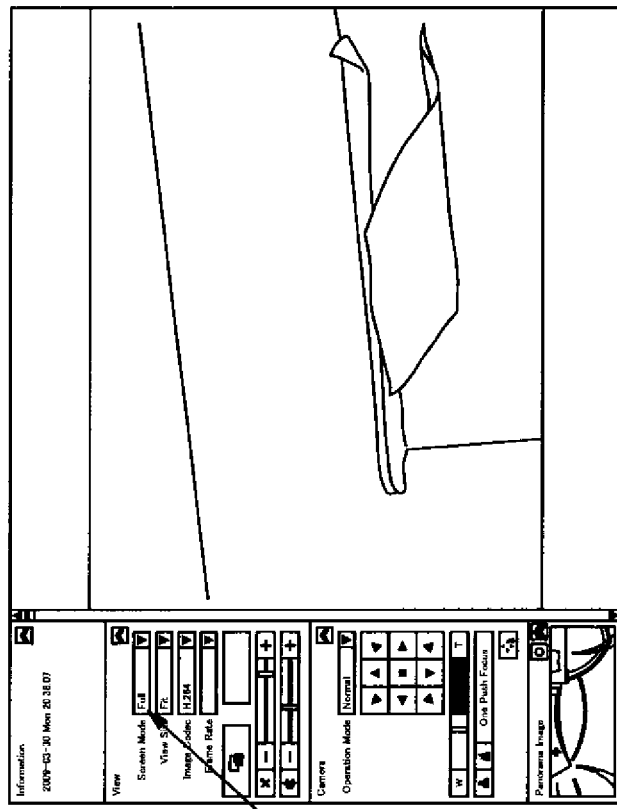
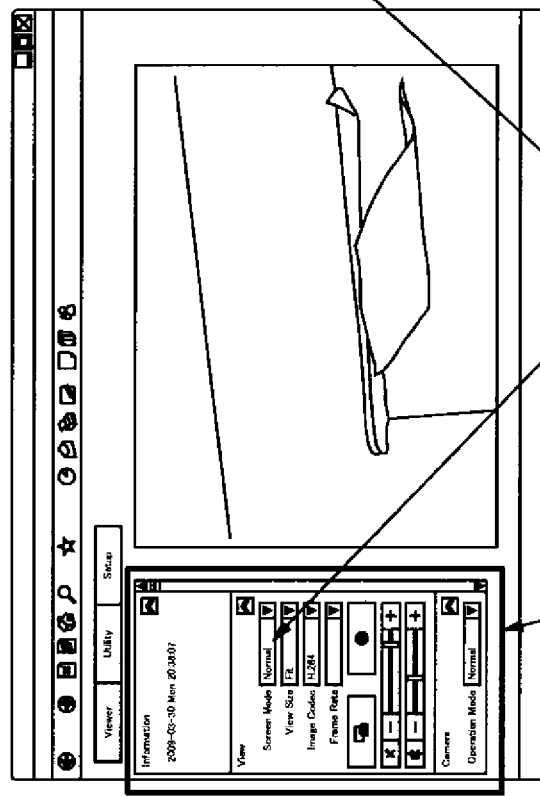
FULL SCREEN IS DISPLAYED WHEN SCREEN MODE IS SET TO FULLSCREEN.
OPERATION PANEL IS LOCATED ON LEFT SIDE.

FIG.20
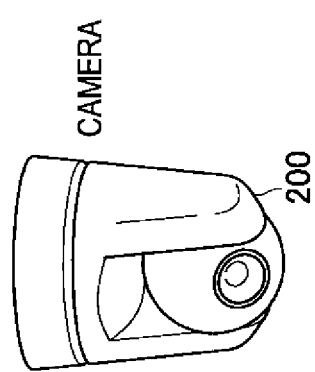
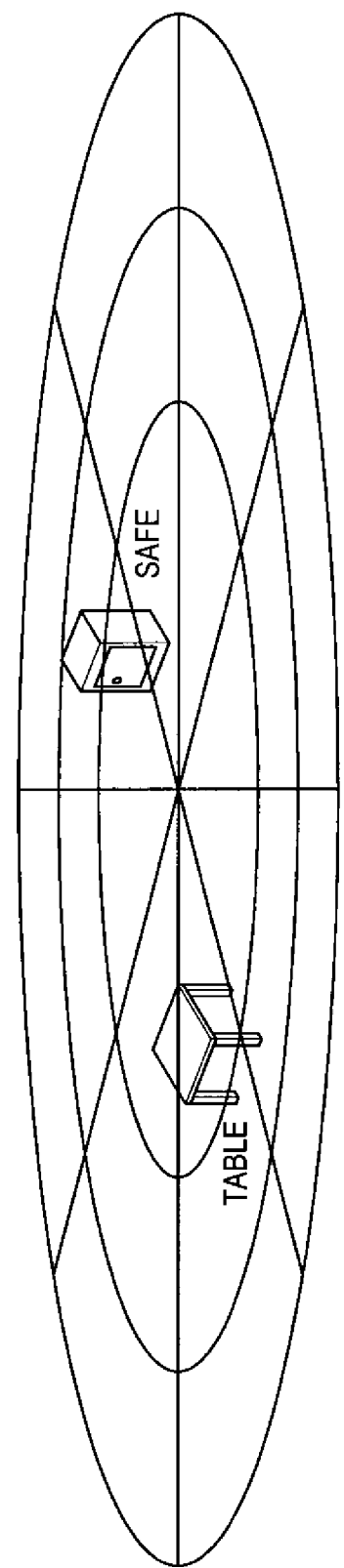

FIG.22
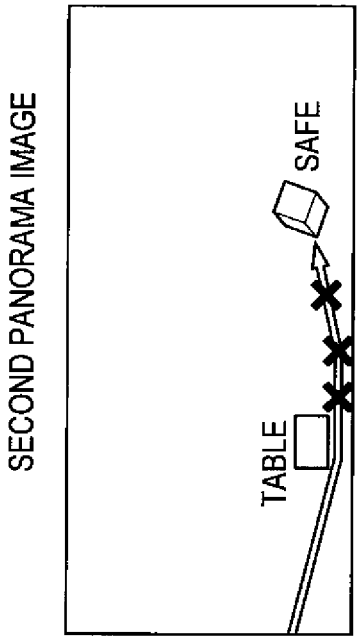
CAMERA VIDEO (LIVE VIDEO)
IMAGE IS SHOT WHILE ZOOMED
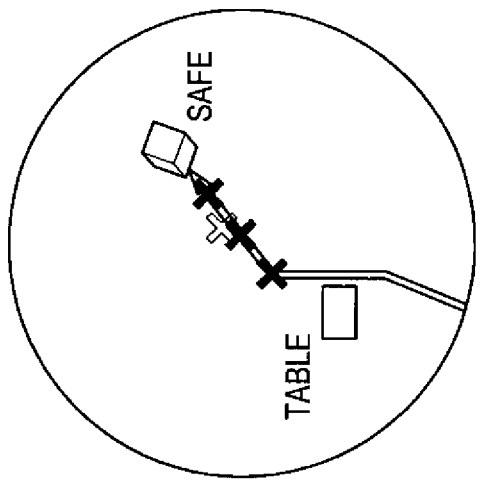
SECOND PANORAMA IMAGE
OPERATION SHOULD BE PERFORMED SUCH THAT MOVEMENT DIRECTION IS CHANGED AT POSITION IMMEDIATELY BELOW IMAGE
✗ : CLICKED POSITION
⇢ : MOVEMENT OF HUMAN
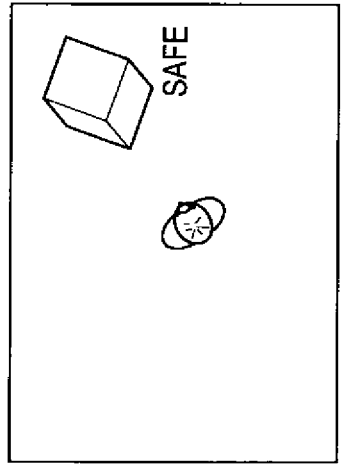
FIRST PANORAMA IMAGE (BIRD'S EYE IMAGE)
CAMERA CAN BE MOVED IN ACCORDANCE WITH MOVEMENT OF HUMAN

CONTROL DEVICE, CAMERA SYSTEM, AND PROGRAM

CROSS-REFERENCE TO RELATED APPLICATIONS

This application is a continuation of U.S. patent application Ser. No. 13/320,550, filed Nov. 15, 2011, which is a continuation of International Application No. PCT/JP2010/059248, filed Jun. 1, 2010, which is based upon and claims the benefit of priority from Japanese Patent Application 2009-138594, filed Jun. 9, 2009, the entire contents of each of which are incorporated herein by reference

TECHNICAL FIELD

The present invention relates to a control device, a camera system, and a program.

BACKGROUND ART

Conventionally, an imaging system that is intended to promptly move the imaging direction of an imaging device in a desired direction has been known, as described in Patent Literature 1 below, for example.

CITATION LIST

Patent Literature

Patent Literature 1: JP 2007-43505A

SUMMARY OF INVENTION

Technical Problem

The technique described in Patent Literature 1 is directed to control the imaging direction of an imaging device based on a rectangular panorama image. However, there is a problem in that control performed based on a panorama image can be intuitive only when the imaged object corresponding to the panorama image is rectangular in shape.

The present invention has been made in view of the foregoing problem, and it is an object of the present invention to provide a control device, a camera system, and a program that are capable of more intuitively controlling the imaging direction of an imaging device based on a panorama image even when the imaged object is not rectangular in shape.

Solution to Problem

In order to solve the aforementioned problem, according to one aspect of the present invention, there is provided a control device including a display control unit that performs control so as to display a panorama image display area in which a panorama image captured with a camera is displayed and an enlarged image display area in which an enlarged image is displayed, the enlarged image being obtained by enlarging an area corresponding to a position specified on the panorama image, and a camera control unit that performs control so as to capture with the camera an image of the area corresponding to the position specified on the panorama image. The display control unit displays on the enlarged image display area the image captured with the camera in accordance with control by the camera control unit, and the panorama image is a circular panorama image.

The circular panorama image may be generated on the basis of images captured with the camera a plurality of times.

The display control unit may, in response to a panorama image switching operation, switch the panorama image displayed in the panorama image display area from the circular panorama image to a rectangular panorama image.

The display control unit may display a circular panorama image and a rectangular panorama image in the panorama image display area.

The display control unit may be capable of moving the panorama image display area on a screen.

In order to solve the aforementioned problem, according to another aspect of the present invention, there is provided a control device including a display control unit that performs control so as to display a panorama image display area in which a panorama image captured with a camera is displayed and an enlarged image display area in which an enlarged image is displayed, the enlarged image being obtained by enlarging an area corresponding to a position specified on the panorama image, and a camera control unit that performs control so as to capture with the camera an image of the area corresponding to the position specified on the panorama image. The display control unit displays on the enlarged image display area the image captured with the camera in accordance with control by the camera control unit, and the display control unit switches a shape of the panorama image in response to a panorama image switching operation.

The display control unit may, in response to the panorama image switching operation, switch the shape of the panorama image from a circular shape to a rectangular shape.

In order to solve the aforementioned problem, according to still another aspect of the present invention, there is provided a camera system including a camera that captures an image and a control device that controls the camera. The control device includes a display control unit that performs control so as to display a panorama image display area in which a panorama image captured with a camera is displayed and an enlarged image display area in which an enlarged image is displayed, the enlarged image being obtained by enlarging an area corresponding to a position specified on the panorama image, and a camera control unit that performs control so as to capture with the camera an image of the area corresponding to the position specified on the panorama image. The display control unit displays on the enlarged image display area the image captured with the camera in accordance with control by the camera control unit, and the panorama image is a circular panorama image.

The circular panorama image may be generated on the basis of images captured with the camera a plurality of times.

The display control unit may, in response to a panorama image switching operation, switch the panorama image displayed in the panorama image display area from the circular panorama image to a rectangular panorama image.

The display control unit may display a circular panorama image and a rectangular panorama image in the panorama image display area.

The display control unit may be capable of moving the panorama image display area on a screen.

In order to solve the aforementioned problem, according to further another aspect of the present invention, there is provided a camera system including a camera that captures an image and a control device that controls the camera. The control device includes a display control unit that performs control so as to display a panorama image display area in which a panorama image captured with a camera is displayed and an enlarged image display area in which an enlarged image is displayed, the enlarged image being obtained by enlarging an area corresponding to a position specified on the panorama image, and a camera control unit that performs control so as to capture with the camera an image of the area corresponding to the position specified on the panorama image. The display control unit displays on the enlarged image display area the image captured with the camera in accordance with control by the camera control unit, and the display control unit switches a shape of the panorama image in response to a panorama image switching operation.

The display control unit may, in response to the panorama image switching operation, switch the shape of the panorama image from a circular shape to a rectangular shape.

In order to solve the aforementioned problem, according to yet another aspect of the present invention, there is provided a program for causing a computer to function as first means for performing control so as to display a panorama image display area in which a panorama image captured with a camera is displayed and an enlarged image display area in which an enlarged image is displayed, the enlarged image being obtained by enlarging an area corresponding to a position specified on the panorama image, and second means for performing control so as to capture with the camera an image of the area corresponding to the position specified on the panorama image.

The circular panorama image may be generated on the basis of images captured with the camera a plurality of times.

The first means may, in response to a panorama image switching operation, switch the panorama image displayed in the panorama image display area from the circular panorama image to a rectangular panorama image.

The first means may display a circular panorama image and a rectangular panorama image in the panorama image display area.

The first means may be capable of moving the panorama image display area on a screen.

Advantageous Effects of Invention

According to the present invention, a control device, a camera system, and a program can be provided that are capable of more intuitively controlling the imaging direction of an imaging device on a panorama image.

BRIEF DESCRIPTION OF DRAWINGS

FIG. 2 is a schematic diagram showing the details of the configurations of a camera terminal device and a center server in the system of FIG. 1.

FIG. 3 FIGS. 3A and 3B are schematic diagrams for illustrating the pan operation and the tilt operation of a camera terminal device 200.

FIG. 4 is a schematic diagram showing the display states of a panorama image and a bird's eye image.

FIG. 6 is a schematic diagram for illustrating a process of generating a bird's eye image signal DF.

FIG. 9 is a schematic diagram showing a display screen of a monitor.

FIG. 10 FIGS. 10A-10C are schematic diagrams for illustrating an operation with an operation panel.

FIG. 20 is a schematic diagram for illustrating the effects of displaying a first panorama image.

FIG. 21 FIGS. 21A and 21B are schematic diagrams for illustrating the effects of displaying a first panorama image.

FIG. 22 is a schematic diagram for illustrating the effects of displaying a first panorama image.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that the description will be given in the following order.

Figure 1:
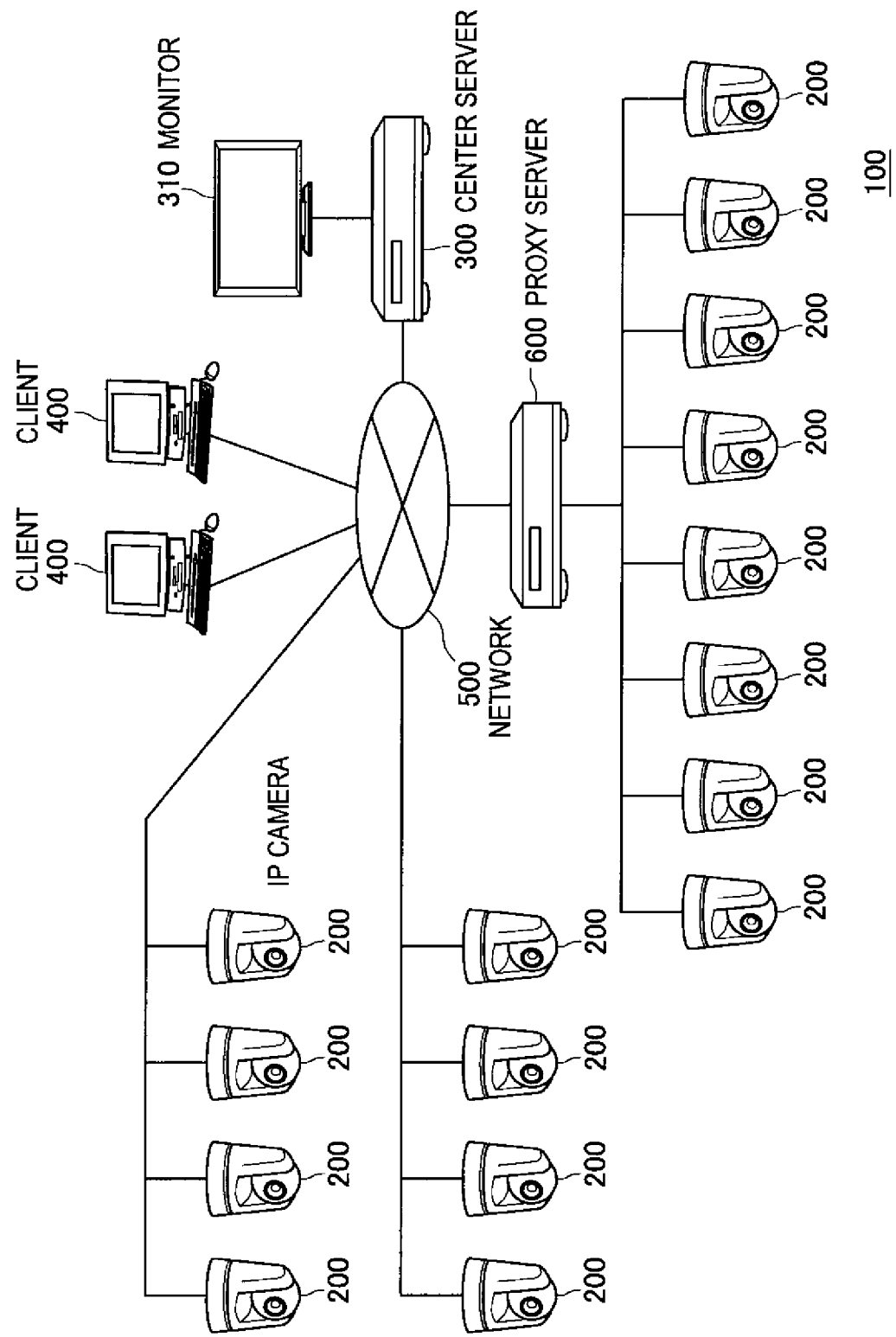
FIG. 1 is a schematic diagram showing the overall configuration of an imaging system in accordance with one embodiment of the present invention.

1. First Embodiment (Example of Imaging System Including Camera Terminal Device and Server)
(1) Configuration Example of Imaging System
(2) Configuration Examples of Camera Terminal Device and Center Server
(3) Operation of Displaying First Panorama Image and Second Panorama Image
(4) Process of Generating First Panorama Image
(5) Regarding GUI
(6) Specifying Shooting Direction on First Panorama Image 1. First Embodiment (1) Configuration Example of Imaging System FIG. 1 is a schematic diagram showing the overall configuration of an imaging system in accordance with one embodiment of the present invention. An imaging system 100 includes camera terminal devices (IP cameras) 200, a center server 300, and clients 400. The plurality of camera terminal devices 200, the center server 300, and the clients 400 are connected via a network 500. In addition, a proxy server 600 is connected to the network 500, and the plurality of camera terminal devices 200 is connected to the proxy server 600. Further, a monitor 310 is connected to the center server 300. In this embodiment, the camera terminal device 200 is, for example, a monitoring camera disposed inside or outside a building. When an image acquired with the camera terminal device 200 is displayed on the monitor 310 of the center server 300, it becomes possible to monitor the area in which the camera terminal device 200 is disposed. The client 400 is connected to the camera terminal devices 200, the center server 300, or the proxy server 600 via the network 500. In addition, the client 400 can have the function of the center server 300 and the function of the monitor 310 described below. A video captured with the camera terminal device 200 is sent to the client 400 via the network 500. On a display screen of the client 400, a first panorama image and a second panorama image are displayed together with a live video described below. Although an IP camera is given as an example of the camera terminal device 200, the camera terminal device 200 is not limited thereto, and can be an analog camera.

Figure 19:
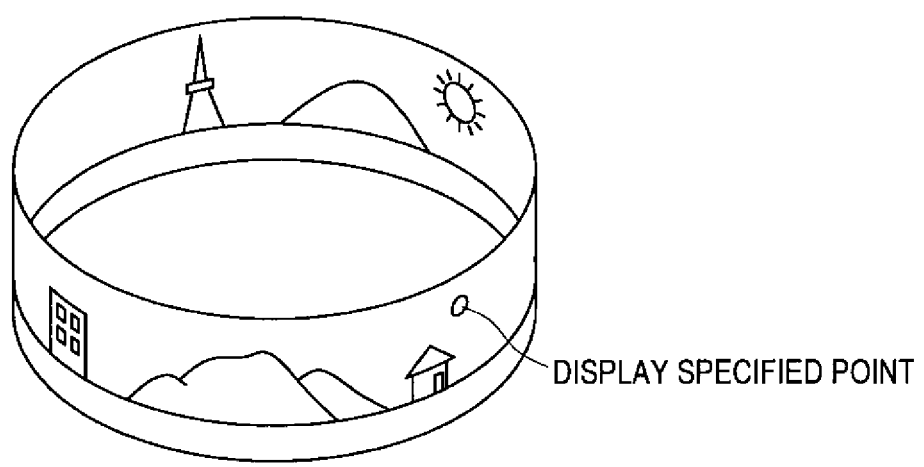
FIG. 19 is a schematic diagram showing an example in which, instead of a normal panorama image, a panorama image displayed on a cylindrical curved plane is used as a reference image.

A panorama image shows the range in which imaging can be performed with the camera terminal device 200. Panorama images come in various shapes. Examples include a circular panorama image and a rectangular panorama image as shown in FIG. 4, and a ring-shaped panorama image like the one projected onto a cylindrical plane as shown in FIG. 19. In the following embodiment, a circular panorama image and a rectangular panorama image will be described as examples of the first panorama image and the second panorama image, respectively.

(2) Configuration Examples of Camera Terminal Device and Center Server

FIG. 2 is a schematic diagram showing the details of the configurations of the camera terminal device 200 and the center server 300 in the system of FIG. 1. Each component of the camera terminal device 200 or the center server 300 shown in FIG. 2 can be constructed from hardware (e.g., a circuit) or from an arithmetic processing unit such as a CPU and software (a program) for causing the CPU to function. A camera unit 201 of the camera terminal device 200 includes an imaging optical unit, and performs an imaging operation based on an imaging control signal CTa supplied from a terminal control unit 210 described below, and further generates a video signal Dcam. In addition, the camera unit 201 supplies the generated video signal Dcam to a signal processing unit 202 via a bus 220. Note that a memory unit 203, an imaging direction control unit 204, a network interface unit 206, a storage unit 207, and the terminal control unit 210 are also connected to the bus 220.

The signal processing unit 202 performs a compression process on the video signal Dcam and stores an obtained video encoded signal DV into the memory unit 203. Further, the signal processing unit 202 generates a video signal of a first panorama image (hereinafter referred to as a "first panorama image signal" DF and a video signal of a second panorama image (hereinafter referred to as a "second panorama image signal") DP using video signals Dcam obtained by sequentially moving the imaging direction of the camera unit 201, and stores them into the storage unit 207. Note that the compression process on the video signal Dcam and the generation of the first panorama image signal DF or the second panorama image signal DP are performed based on a signal processing control signal CTb supplied from the terminal control unit 210 described below.

The imaging direction control unit 204 calculates the speed and acceleration for moving the imaging direction of the camera unit 201 to a direction indicated by a direction control signal CTc supplied from the terminal control unit 210 described below. Based on the calculation result, the imaging direction control unit 204 further generates a drive signal MDp for performing a pan operation and a drive signal MDt for performing a tilt operation, and supplies them to an imaging direction adjustment unit 205. Furthermore, the imaging direction control unit 204 generates a camera position information signal PM indicative of the imaging direction of the camera unit 201 and supplies it to the terminal control unit 210.

The imaging direction adjustment unit 205 includes a pan operation motor for moving the camera unit 201 in the horizontal direction and a tilt operation motor for moving the camera unit 201 in the vertical direction. The imaging direction adjustment unit 205 drives the pan operation motor in accordance with the drive signal MDp and the tilt operation motor in accordance with the drive signal MDt to adjust the imaging direction of the camera unit 201 to the direction indicated by the direction control signal CTc. Further, the imaging direction adjustment unit 205 performs a pan operation in an endless manner without operating range limitations.

Figure 3A:
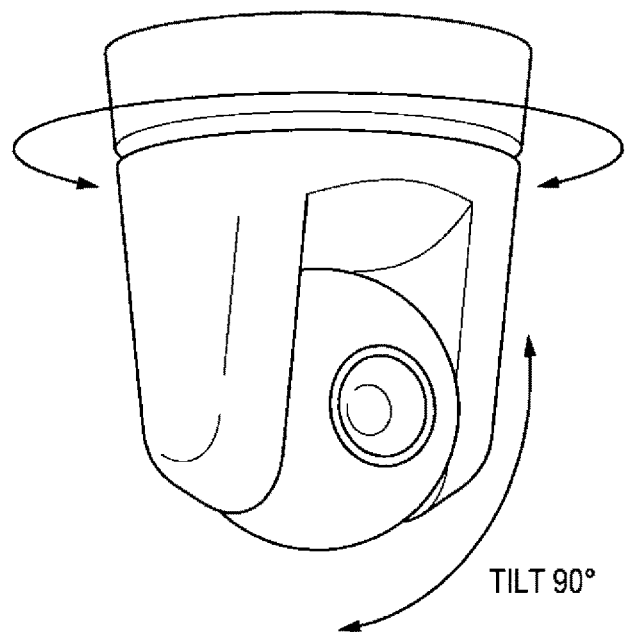
Figure 3B:
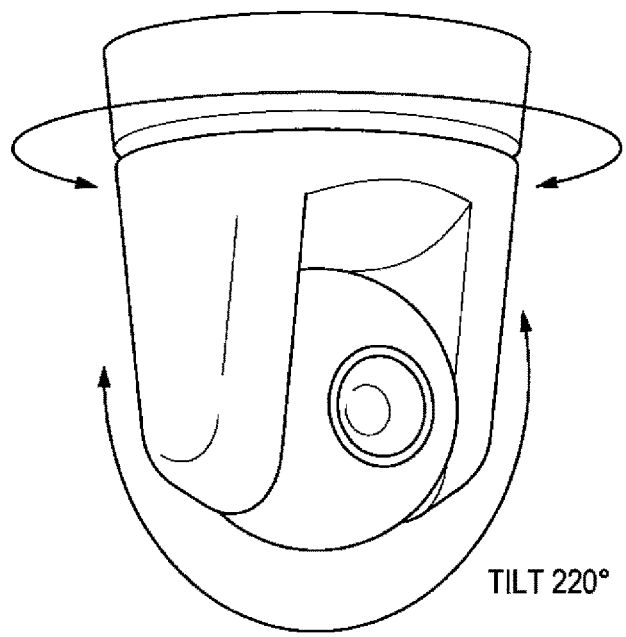

FIG. 3 is a schematic diagram for illustrating a pan operation and a tilt operation of the camera terminal device 200, which shows a, case in which the camera terminal device 200 is mounted on a ceiling or the like. Herein, FIG. 3B shows pan/tilt operations of the camera terminal device 200 in accordance with this embodiment. Meanwhile, FIG. 3A shows pan/tilt operations of a typical camera terminal device for comparison purposes. As shown in FIG. 3A, the typical camera terminal device performs a 360° endless pan operation, and performs a tilt operation in the range of 90° from the vertical direction to the horizontal direction. In contrast, the camera terminal device 200 in accordance with this embodiment can perform a 360° endless pan operation, and perform a tilt operation in the range of 220° with reference to the vertical direction as the center. Thus, it is possible to generate a video signal DF of a first panorama image with a method described below and store it into the storage unit 207. The first panorama image described below is a circular panorama image. When operating the imaging direction by striding over an area around the center of the circle, the camera terminal device 200 in accordance with this embodiment is able to mechanically move the imaging direction to a target imaging direction via the shortest route. Meanwhile, the typical camera terminal device is unable to mechanically move the camera imaging direction in such a way that it strides over the center of the circle.

The network interface unit 206 is an interface for performing communication between the camera terminal device 200 and the center server 300 via the network 500.

The terminal control unit 210 controls the camera unit 201 using the imaging control signal CTa, controls the signal processing unit 202 using the signal processing control signal CTb, controls the imaging direction control unit 204 using the direction control signal CTc, and performs imaging while sequentially moving the imaging direction. Then, the terminal control unit 210, based on the obtained video signal Dcam, generates the first panorama image signal DF and the second panorama image signal DP, and stores them into the storage unit 207.

The imaging system 100 in accordance with this embodiment can transmit a live video in accordance with the video signal Dcam, together with a first panorama image or a second panorama image in accordance with the first panorama image signal DF or the second panorama image signal DP, from the camera terminal device 200 to the center server 300, and display them on the monitor 310. Note that in this specification, the first panorama image and the second panorama image may be referred to as reference images. FIG. 4 is a schematic diagram showing the display states of the second panorama image and the first panorama image. The center server 300 can, in response to selection by a user, display one of the first panorama image or the second panorama image together with a live video on the monitor 310. Alternatively, the center server 300 can be configured to display both the first panorama image and the second panorama image together with a live video. Although FIG. 4 shows as the first panorama image a circular panorama image in which an image around the center is missing, the first panorama image is not limited thereto, and a circular panorama image in which an image around the center is not missing can be used as the first panorama image.

The camera terminal device 200 is disposed on a ceiling or the like, and displays an image of an area in the downward direction of the camera terminal device 200. Therefore, as shown in FIG. 4, the first panorama image is acquired in a pan range of 360° and a tilt range of 220° with reference to a vertical line, which extends downward from the camera terminal device 200, as the center, and the outline of the first panorama image is circular.

As described above, the imaging direction adjustment unit 205 is so constructed as to perform a pan operation in an endless manner. Accordingly, in order to avoid overlapping of images, the second panorama image stored in the storage unit 207 provides a "+180°" angle difference from a reference direction at one end and a "−180°" angle difference from the reference direction at the other end, as shown in FIG. 4, for example. Further, since the pan operating range is not limited, it is not possible to determine the center position of the operating range as a reference direction unlike when the operating range is limited, for example. For this reason, a reference direction is preset, and a second panorama image signal DP is generated in such a way that the preset reference direction coincides with the center position of a second panorama image. The imaging direction control unit 204 generates a signal indicative of, for example, the angle difference of the imaging direction with respect to the preset reference direction, as a camera position information signal PM.

If a reference direction is thus preset, it is not necessary to determine which direction has been used as a reference of the imaging operation to generate a second panorama image. Assuming that the camera position information signal PM indicates the angle difference of the imaging direction with respect to the reference direction, it is possible to easily determine the position of the imaging direction on the second panorama image based on the camera position information signal PM.

For a tilt operation, a reference direction is also preset, and the camera position information signal PM indicates the angle difference of the imaging direction with respect to the reference direction. Accordingly, it is possible to easily identify the position of the imaging direction on each of the first panorama image and the second panorama image based on the camera position information signal PM. Note that for a tilt operation, if the camera terminal device 200 is disposed on a ceiling, the vertical direction can be set as the reference direction.

The terminal control unit 210 analyzes a command signal CM supplied from the center server 300 via the network interface unit 206 to generate an imaging control signal CTa, a signal processing control signal CTb, and a direction control signal CTc. Further, the terminal control unit 210 performs a process of sending out the video encoded signal DV stored in the memory unit 203, the first panorama image signal DF and the second panorama image signal DP stored in the storage unit 207, and the camera position information signal PM supplied from the imaging direction control unit 204 to the center server 300.

A network interface unit 301 of the center server 300 is an interface for performing communication between the camera terminal device 200 and the center server 300 via the network 500. The network interface unit 301 supplies the video encoded signal DV supplied from the camera terminal device 200 to a decompression processing unit 302. Further, the network interface unit 301 supplies the camera position information signal PM to a position determination processing unit 303 and supplies the first panorama image signal DF and the second panorama image signal DP to the image processing unit 304.

The decompression processing unit 302 performs a decompression process on the video encoded signal DV and supplies the obtained video signal Dcam to a display processing unit 305.

The position determination processing unit 303 determines which position in the first panorama image or the second panorama image corresponds to the imaging direction indicated by the camera position information signal PM, and supplies a position determination result KP to the image processing unit 304. In regard to the camera position information signal PM, if the first panorama image signal DF or the second panorama image signal DP is generated in such a way that the preset reference direction coincides with the center position of a pan operation and a tilt operation and the camera position information signal PM indicates the angle difference between the reference direction and the current imaging direction as described above, it is possible to easily determine which position in the bird's eye image or the second panorama image corresponds to the current imaging direction, based on the camera position information signal PM.

The image processing unit 304 performs image processing based on the position determination result KP, and generates a first panorama image signal DFC of the first panorama image and a second panorama image signal DPC of the second panorama image. In regard to the second panorama image signal DPC, it is possible to generate the second panorama image signal DPC in which the position determined from the position determination result KP is set as the center position. In this case, the image processing unit 304 determines the amount of difference between the determined position and the center position of the second panorama image, and processes the second panorama image in such a way that the determined position becomes the center position of the image, based on the determined amount of difference. That is, the image processing unit 304 sets a second panorama image display frame of "+180°" in which the determined position becomes the center position, pastes a second panorama image of the area for the amount of difference outside the second panorama image display frame to the area having no image, and thereby generates the second panorama image signal DPC of the second panorama image in which the determined position becomes the center position. In the case of the first panorama image signal DFC, in a "mode in which the first panorama image is rotated" described below, the amount of difference between the determined position and the reference position in the pan direction of the first panorama image is also determined as with the second panorama image signal DPC, and, based on the determined amount of difference, the first panorama image is processed in such a way that the determined position is located above the image. Further, the image processing unit 304 displays a position (a position that the optical axis of the imaging optical unit of the camera unit 201 faces) that is based on the position determination result KP on each of the first panorama image signal DFC and the second panorama image signal DPC. Further, the image processing unit 304 supplies the first panorama image signal DFC and the second panorama image signal DPC generated by performing image processing to the display processing unit 305.

The display processing unit 305 generates a display drive signal HD using the video signal Dcam supplied from the decompression processing unit 302 and the first panorama image signal DFC and the second panorama image signal DPC supplied from the image processing unit 304, and supplies the display drive signal HD to the monitor 310. In addition, the display processing unit 305 generates a display drive signal HD using a video signal for GUI generated based on a GUI display control signal CTg supplied from the control unit 310 described below, and supplies the display drive signal HD to the monitor 310.

The monitor 310, based on the display drive signal HD, displays the first panorama image, the second panorama image in which the imaging direction is at the center position, an image (live video) shot by the camera unit 201, a GUI image, and the like on the screen by driving display elements such as liquid crystal elements, plasma display elements, or a cathode ray tube.

For the user interface unit 315, a GUI is used. The user interface unit 315 presents information to a user using the monitor 310. When a user operation is performed using an operation input means such as a pointing device or a keyboard based on the presented information, the user interface unit 315 supplies an operation signal US in accordance with the user operation to the control unit 310 to cause it to perform a desired operation or the like.

Based on the operation signal US and the display state of the monitor 310, the control unit 310 determines what kind of process the user has selected and what kind of process the user has requested for execution. Based on the determination result, the control unit 310 generates a command signal CTm and supplies it to each unit to control the operation of the center server 300. Further, based on the determination result, the control unit 310 generates a command signal CM and supplies it to the camera terminal device 200 via the network interface unit 301 to control the operation of the camera terminal device 200. Furthermore, the control unit 310 generates a GUI display control signal CTg and supplies it to the display processing unit 305.

Although the camera terminal device 200 generates the video signal DF of the first panorama image and the video signal DP of the second panorama image from the video signal Dcam in the aforementioned example, the video signal DF of the first panorama image and the video signal DP of the second panorama image can be generated by the center server 300 or the client 400. In such a case, the network interface unit 206 of the camera terminal device 200 sends the video signal Dcam output from the camera block 201 to the center server 300 or the client 400. The center server 300 or the client 400 can, by having a similar signal processing unit to that of the camera terminal device 200, generate the video signal DF of the first panorama image and the video signal DP of the second panorama image. The video signal DF of the first panorama image and the video signal DP of the second panorama image are stored into memory such as a hard disk of the center server 300 or the client 400.

(3) Operation of Displaying First Panorama Image and Second Panorama Image

Next, the operation of displaying the first panorama image and the second panorama image will be described. At the start of the operation, the control unit 310 sends to the camera terminal device 200 the command signal CM requesting the first panorama image signal DF, the second panorama image signal DP, the camera position information signal PM, and the video encoded signal DV. If the storage unit 207 has stored therein the first panorama image signal DF and the second panorama image signal DP, the camera terminal device 200 reads the first panorama image signal DF and the second panorama image signal DP and sends them to the center server 300. If the image storage unit 207 does not have stored therein the first panorama image signal DF or the second panorama image signal DP, the camera terminal device 200 controls the camera unit 201, the signal processing unit 202, and the imaging direction control unit 204 so as to perform an imaging operation while moving the imaging direction. Thus, the camera terminal device 200 generates the first panorama image signal DF and the second panorama image signal DP and sends them to the center server 300. Note that the camera terminal device 200 stores the generated first panorama image signal DF and second panorama image signal DP into the storage unit 207.

The camera terminal device 200 supplies the camera position information signal PM generated by the imaging direction control unit 204 to the center server 300. Further, the camera terminal device 200 starts the imaging operation of the camera unit 201, and compresses the obtained video signal Dcam with the signal processing unit 202 and then stores the video encoded signal DV into the memory unit 203. Furthermore, the camera terminal device 200 supplies the video encoded signal DV stored in the memory unit 203 to the center server 30. Note that when the camera terminal device 200 and the network 500 are connected via the proxy server 600 as shown in FIG. 1, exchange of information between the camera terminal device 200 and the center server 300 is conducted via the proxy server 600.

The position determination processing unit 303 of the center server 300 determines which position in the first panorama image or the second panorama image corresponds to the imaging direction indicated by the camera position information signal PM, and supplies a position determination result KP to the image processing unit 304. In regard to the second panorama image, for example, when the angle difference indicated by the camera position information signal PM is "0°," for example, the imaging direction is located at the center position of the second panorama image because the imaging direction is set to the reference direction.

The image processing unit 304 performs image processing based on the position determination result KP. If the position determination result KP indicates that the imaging direction is located at the center position of the second panorama image, the image of the imaging direction is at the center of the panorama image. Thus, the image processing unit 304 does not perform second panorama image processing and supplies the second panorama image signal DP as a second panorama image signal DPC to the display processing unit 305. Meanwhile, when the imaging direction is not located at the center position of the second panorama image, the image processing unit 304 determines the amount of difference between the determined position of the imaging direction and the center position of the second panorama image, and processes, based on the determined amount of difference, the second panorama image in such a way that the determined position becomes the center position of the image, and thus generates a second panorama image signal DPC.

Therefore, in regard to the second panorama image, when the angle difference indicated by the camera position information signal PM is "0°." for example, the image captured with the camera unit 201, the second panorama image in which the center position coincides with the reference direction, and the image related to the GUI are displayed on the screen of the monitor 310 that is driven in accordance with the display drive signal HD from the display processing unit 305.

In regard to the first panorama image, in the case of the "mode in which the first panorama image is rotated" described below, the amount of difference between the determined position and the reference position in the pan direction of the first panorama image is determined as with the second panorama image signal DPC, and, based on the determined amount of difference, the first panorama image is rotated in such a way that the determined position is located below the image (on a straight line L described above), so that a first panorama image signal DFC is generated. In addition, the image processing unit 304 displays, in each of the first panorama image signal DFC and the second panorama image signal DPC, the position of the imaging direction (a position that the optical axis of the imaging optical unit of the camera unit 201 faces) based on the position determination result KP.

The decompression processing unit 302 decompresses the video encoded signal DV and supplies the obtained video signal Dcam to the display processing unit 305. The control unit 310 supplies the GUI display control signal CTg used for GUI display to the display processing unit 305.

Figure 5:
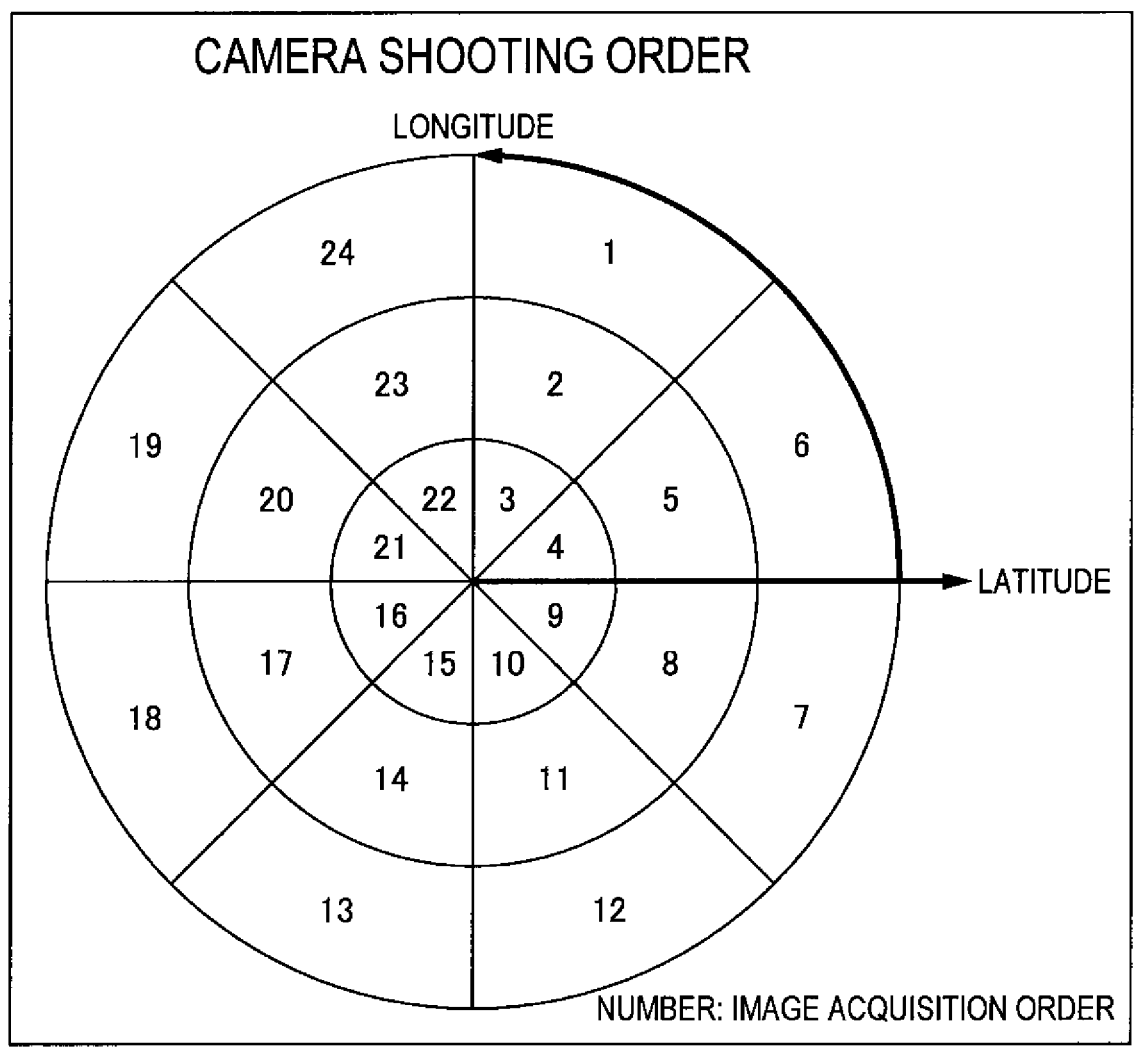
FIG. 5 is a schematic diagram for illustrating a process of generating a bird's eye image signal DF.

(4) Process of Generating First Panorama Image Next, a process of generating the first panorama image signal DF will be described with reference to FIG. 5 to FIG. 8. When the first panorama image signal DF is generated, an image of each area of the first panorama image is acquired. First, as shown in FIG. 5, with the zoom of the camera terminal device 200 fixed, pan and tilt are performed at given intervals to acquire still images. The number shown in FIG. 5 indicates the image acquisition order.

Next, coordinate transformation of a still image coordinate system is performed in accordance with the following procedures [1] to [3]. Herein, as shown in FIG. 6, each point in a still image is transformed into a relative position (x,y,z) seen from the center of rotation of the camera terminal device 200.

The viewpoint of a camera with a horizontal angle of view of thh [degree] and an aspect ratio of a is placed at the origin, and is made to point in the −z direction. When the plane (x,y,−L) of an object at the position of a distance L is considered, the viewable range is a rectangle of 2Lx×2Ly. Herein, the relationship of Lx=L·tan(thh/2), Ly=Lx/a is established.

The posture of the camera is originally represented by (x,y,z,p,q,r). However, when it is considered that the position of the viewpoint is fixed at the origin, x=y=z=0. Thus, only (p,q,r), (p: Pan (y-axis rotation), q: Tilt (x-axis rotation), and r: roll (z-axis rotation)) is considered herein.

When a point (j,i) in the rectangle of (2Lx)×(2Ly) is used, the following formula is established.

$$x = Lx \times (j-Lx)/Lx$$

$$y = Ly \times (i-Ly)/Ly$$

$$z = -L$$

Using (x,y,z), the following Roll transformation, Tilt transformation, and Pan transformation formulae are applied.

Roll Transformation [Math. 1]

$$\begin{bmatrix} x1 \\ y1 \\ z1 \end{bmatrix} = \begin{bmatrix} \cos r & -\sin r & 0 \\ \sin r & \cos r & 0 \\ 0 & 0 & 1 \end{bmatrix} \cdot \begin{bmatrix} x \\ y \\ z \end{bmatrix}$$

Tilt Transformation $$\begin{bmatrix} x2 \\ y2 \\ z2 \end{bmatrix} = \begin{bmatrix} 1 & 0 & 0 \\ 0 & \cos q & -\sin q \\ 0 & \sin q & \cos q \end{bmatrix} \cdot \begin{bmatrix} x1 \\ y1 \\ z1 \end{bmatrix}$$

Pan Transformation $$\begin{bmatrix} x3 \\ y3 \\ z3 \end{bmatrix} = \begin{bmatrix} \cos p & 0 & -\sin p \\ 0 & 1 & 0 \\ \sin p & 0 & \cos p \end{bmatrix} \begin{bmatrix} x2 \\ y2 \\ z2 \end{bmatrix}$$

(x3,y3,z3) obtained herein is the value represented by a coordinate system obtained by viewing a given point (x,y,z) in a still image from the center of rotation of the camera.

Figure 7:
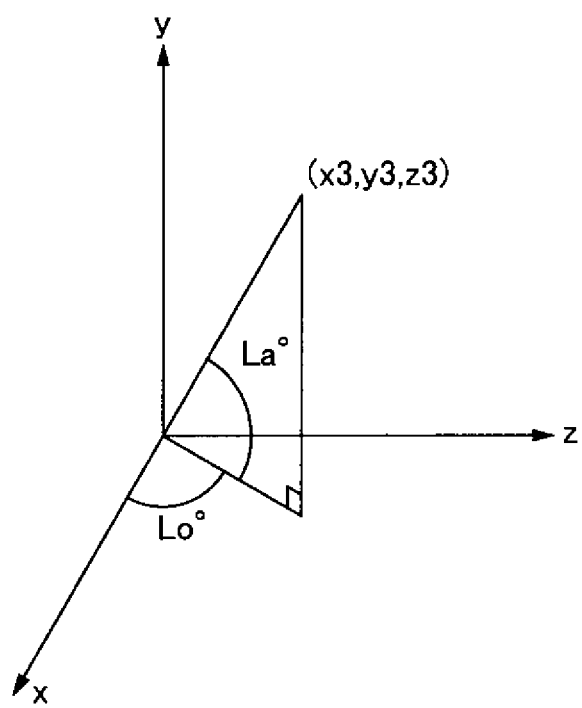
FIG. 7 is a schematic diagram for illustrating a process of generating a bird's eye image signal DF.

Next, the relative position is transformed into the latitude and the longitude. Herein, as shown in FIG. 7, (x3,y3,z3) obtained above is transformed into the latitude and the longitude. The angle made by the direction of (x3,y3,z3) with the horizontal direction for the −z direction is the longitude, and the angle made by the direction of (x3,y3,z3) with the x-z plane is the latitude, and can be determined from the following formulae.

Latitude $$La = \tan^{-1}(y3/::\mathrm{sqrt}(x3*x3+z3*z3))$$

Longitude (Lo)
when 0.0<z3
   in the case where 0.0<x3 Lo=90.0+La
   in the case where 0.0≥x3 Lo=−90.0−La
when 0.0≥z3

$$Lo = \tan^{-1}(x3/z3)/\mathrm{RAD},$$

where RAD=π/180 (π: circular constant)

Figure 8:
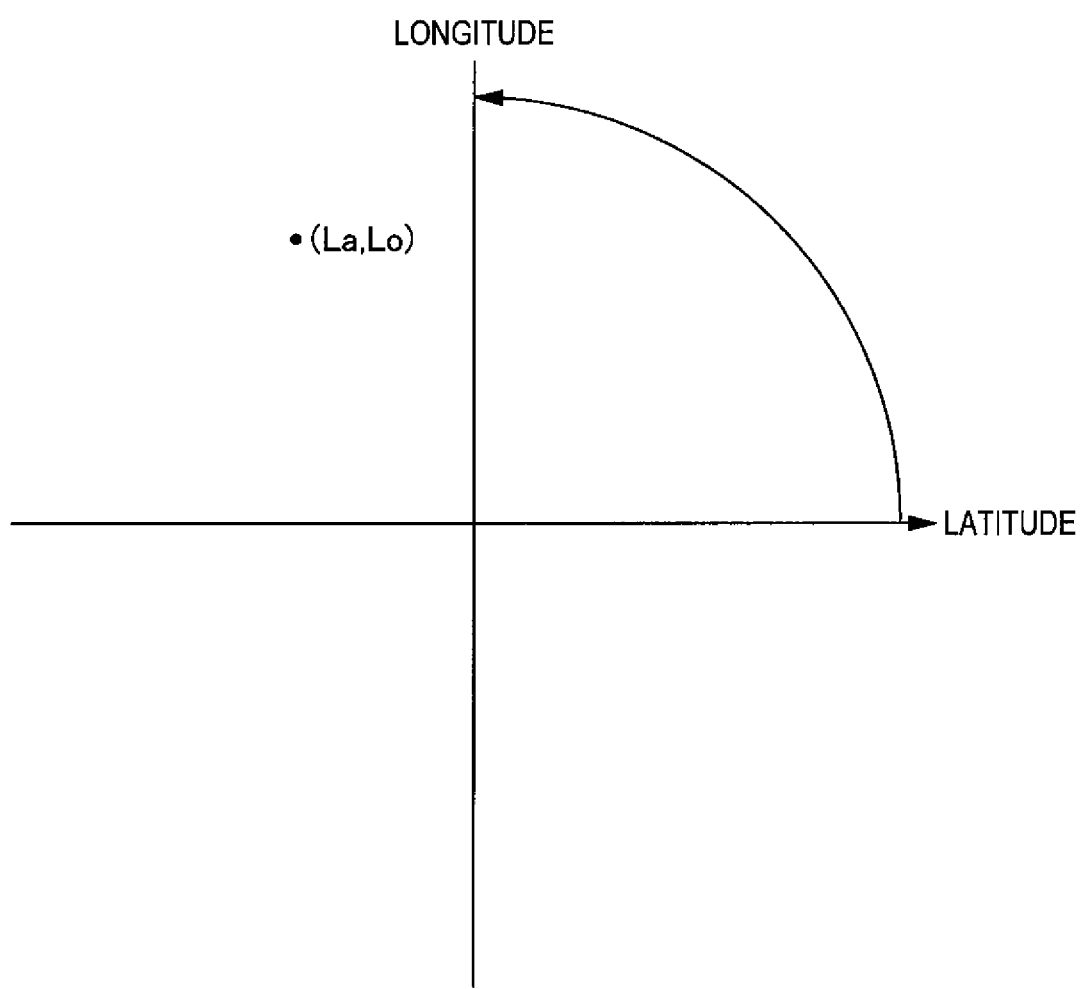
FIG. 8 is a schematic diagram for illustrating a process of generating a bird's eye image signal DF.

Next, transformation into a first panorama image is performed. Herein, as shown in FIG. 8, the obtained latitude and longitude (La,Lo) are represented by the coordinate system of the axis of the radius and the coordinate system of the circumferential direction, respectively.

The first panorama image signal DF can be generated in a manner described above.

(5) Regarding GUI

Next, a GUI will be described. FIG. 9 is a schematic diagram showing a display screen of the monitor 310. FIG. 9 shows both a normal image and a full screen display. In both cases, an operation panel (a control panel) is displayed on the left side of the screen, and a live video is displayed on the right side of the screen. When "Screen Mode" on the operation panel is set to "Full," a full screen is displayed.

FIG. 10 is a schematic diagram for illustrating an operation with the operation panel. The operation panel includes panels for individual functions, and each panel can be stored by being folded. The panels are classified as follows.

Figures 10A, 10B, 10C:
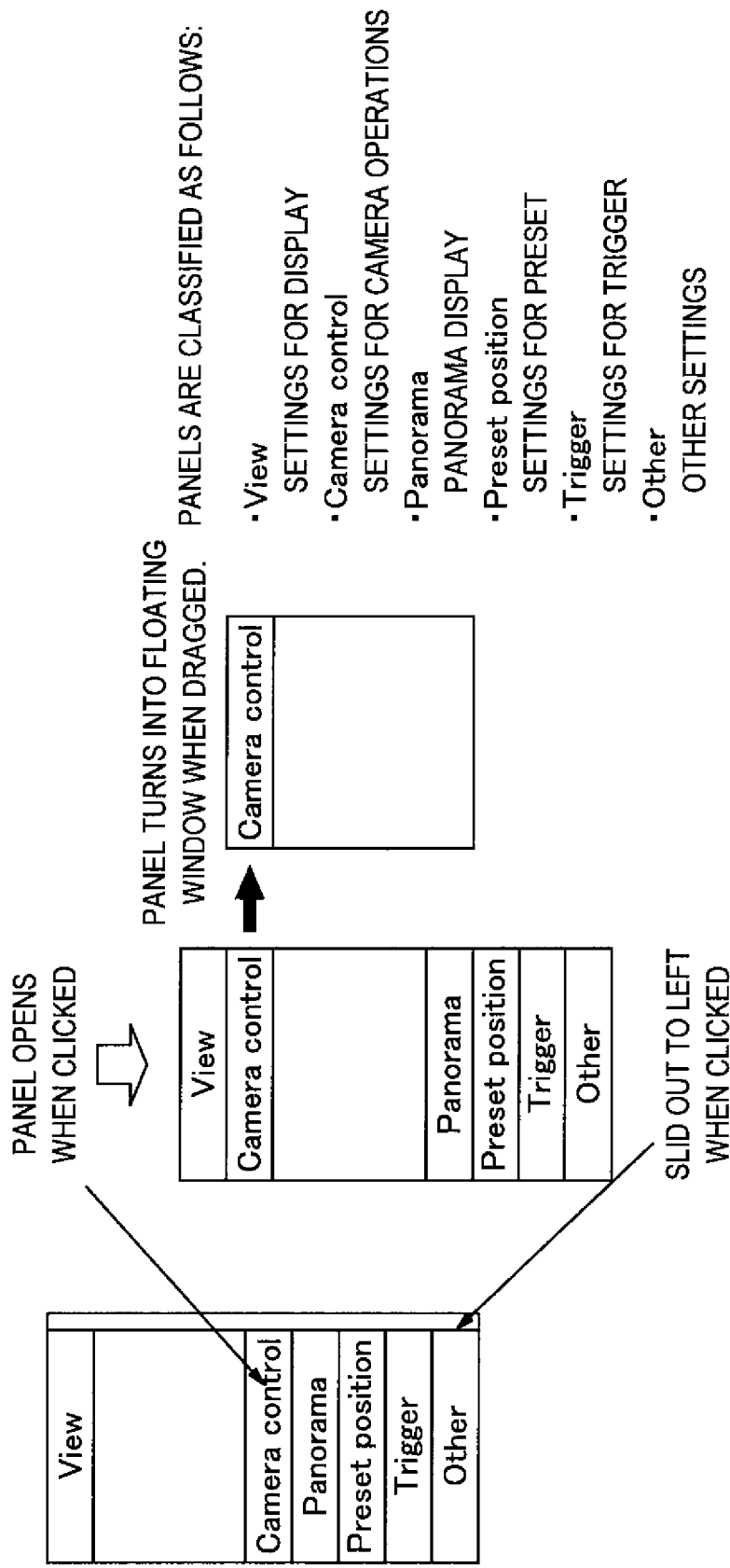

View
Settings for display
Camera control
Settings for camera operations
Panorama
Panorama display
Preset position
Settings for preset
Trigger
Settings for trigger
Other
Other settings Each panel is configured to open when clicked. FIG. 10A shows a state in which "View" is clicked and a menu is displayed below the "View" field. Meanwhile, FIG. 10B shows a state in which "Camera control" is clicked and a menu is displayed below the "Camera control" field. In addition, FIG. 10C shows a state in which the panel "Camera control" is dragged. The panel "Camera control" can be turned into a floating window when dragged.

Figure 11:
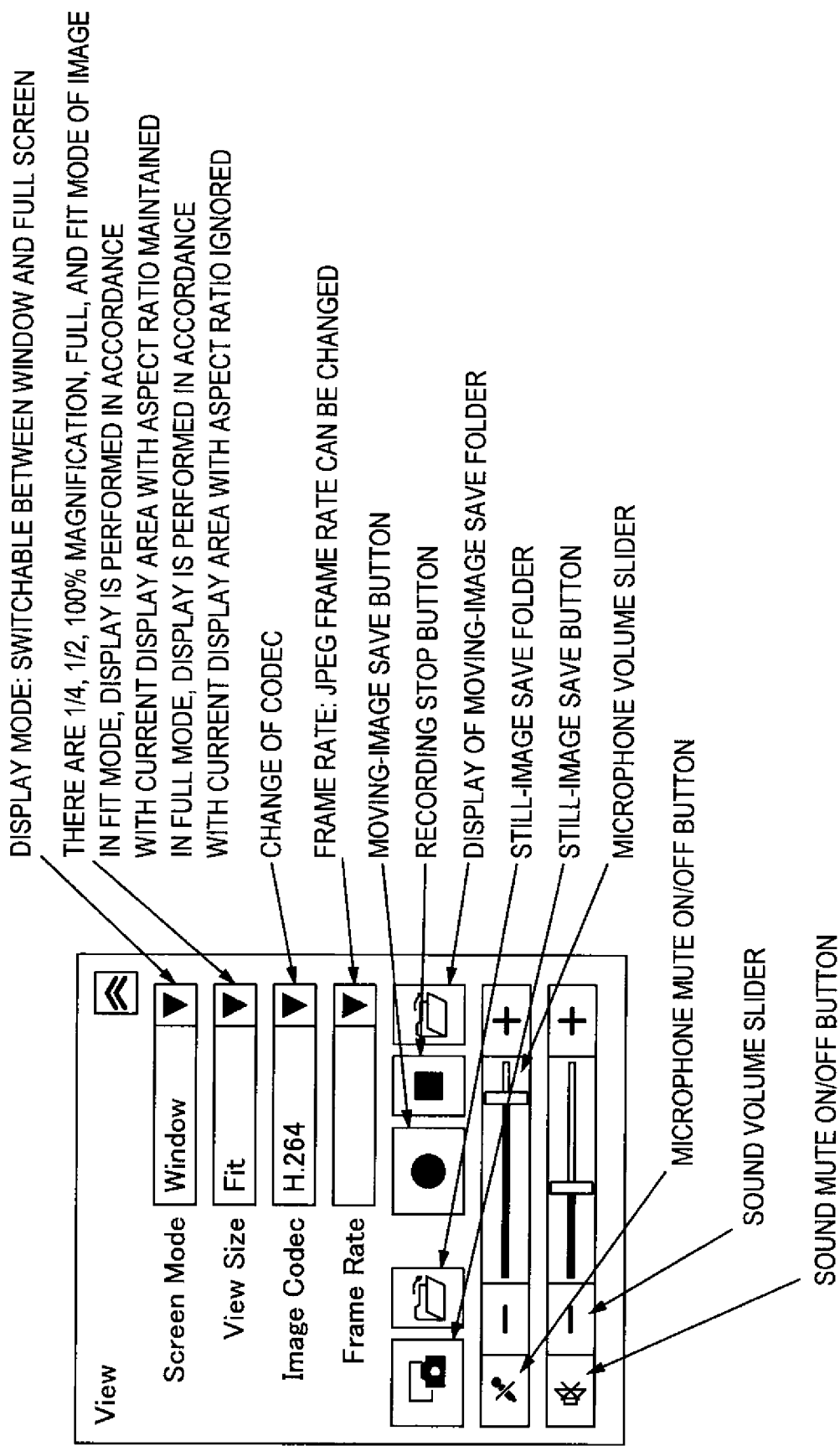
FIG. 11 is a schematic diagram showing a state in which a menu such as "Screen Mode," "View Size," "Image Codec," or "Frame Rate" is displayed when a panel "View" is clicked.

FIG. 11 shows a state in which menus such as "Screen Mode," "View Size," "Image Codec," and "Frame Rate" are displayed when the panel "View" is clicked. With the "Screen Mode" menu, the display mode can be switched between normal and a full screen. With the "View Size," ¼, ½, 100% magnification, or Fit mode of an image can be specified. In the Fit mode, an image is displayed in accordance with the size of the current display area. With the "Image Codec" menu, Codec can be changed. With the "Frame Rate" menu, the JPEG frame rate can be changed. A moving-image save button is used to save a moving image, and a still-image save button is used to save a still image. Besides, a microphone volume slider, a microphone mute on/off button, a sound volume slider, a sound mute on/off button, and the like are provided.

Figure 12:
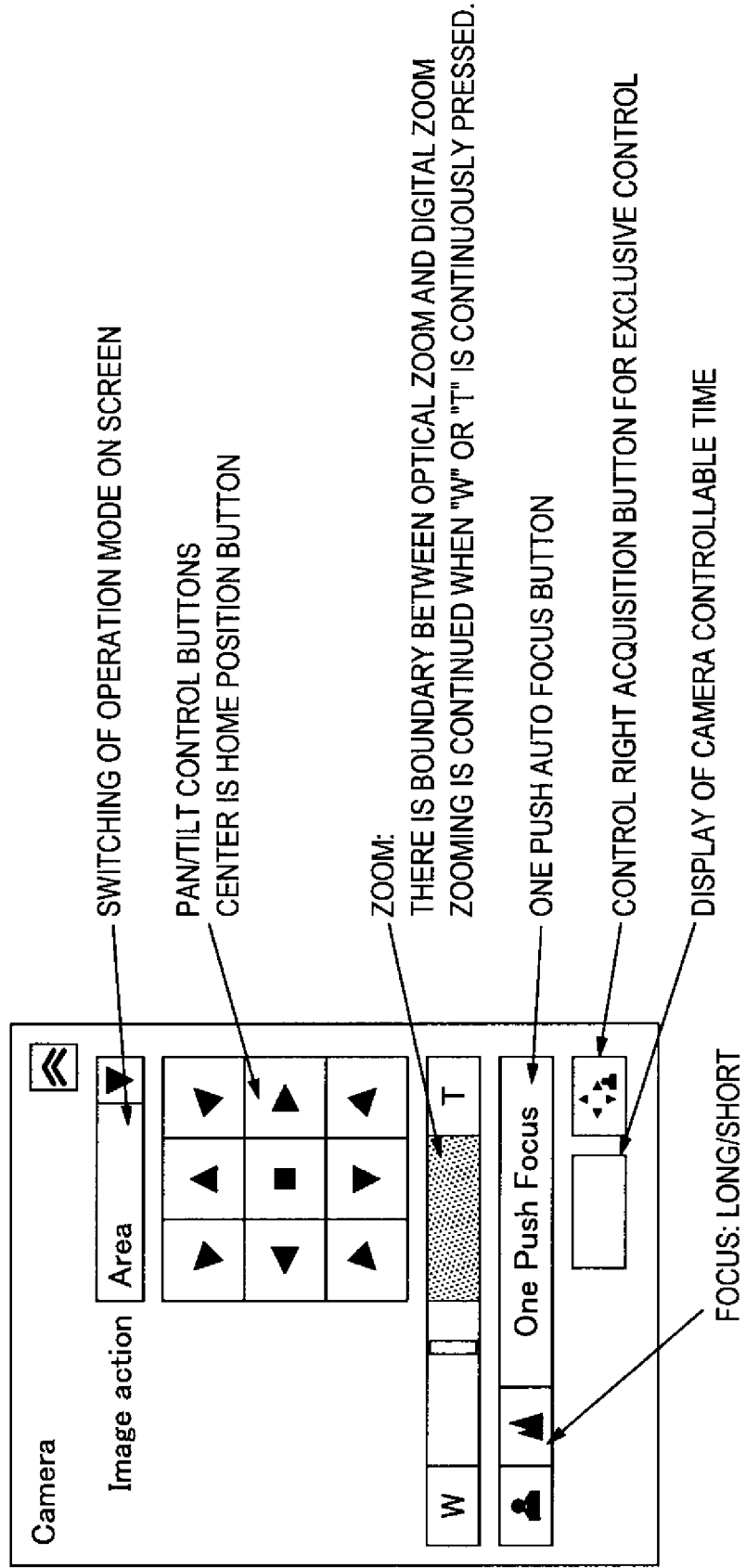
FIG. 12 is a schematic diagram showing a menu displayed when a panel "Camera" is clicked.

FIG. 12 shows a menu displayed when a panel "Camera" is clicked. With an "Operation Mode" menu, the operation mode can be switched on an image. With pan/tilt control buttons, it is possible to specify pan/tilt directions by operating the buttons of the arrow directions. A button located at the center of the pan/tilt control buttons is a home position button. A zoom button is a button for specifying the zoom of the camera terminal device 200, and is constructed such that the boundary between the optical zoom and the digital zoom can be clearly seen. When a zoom button "W" or "T" is continuously pressed, a zoom operation is continuously performed. A focus button is used to set the focus to "long range" or "short range." Besides, various buttons such as a ONE PUSH AUTO FOCUS button and a control right acquisition button for exclusive control are provided.

Figure 13:
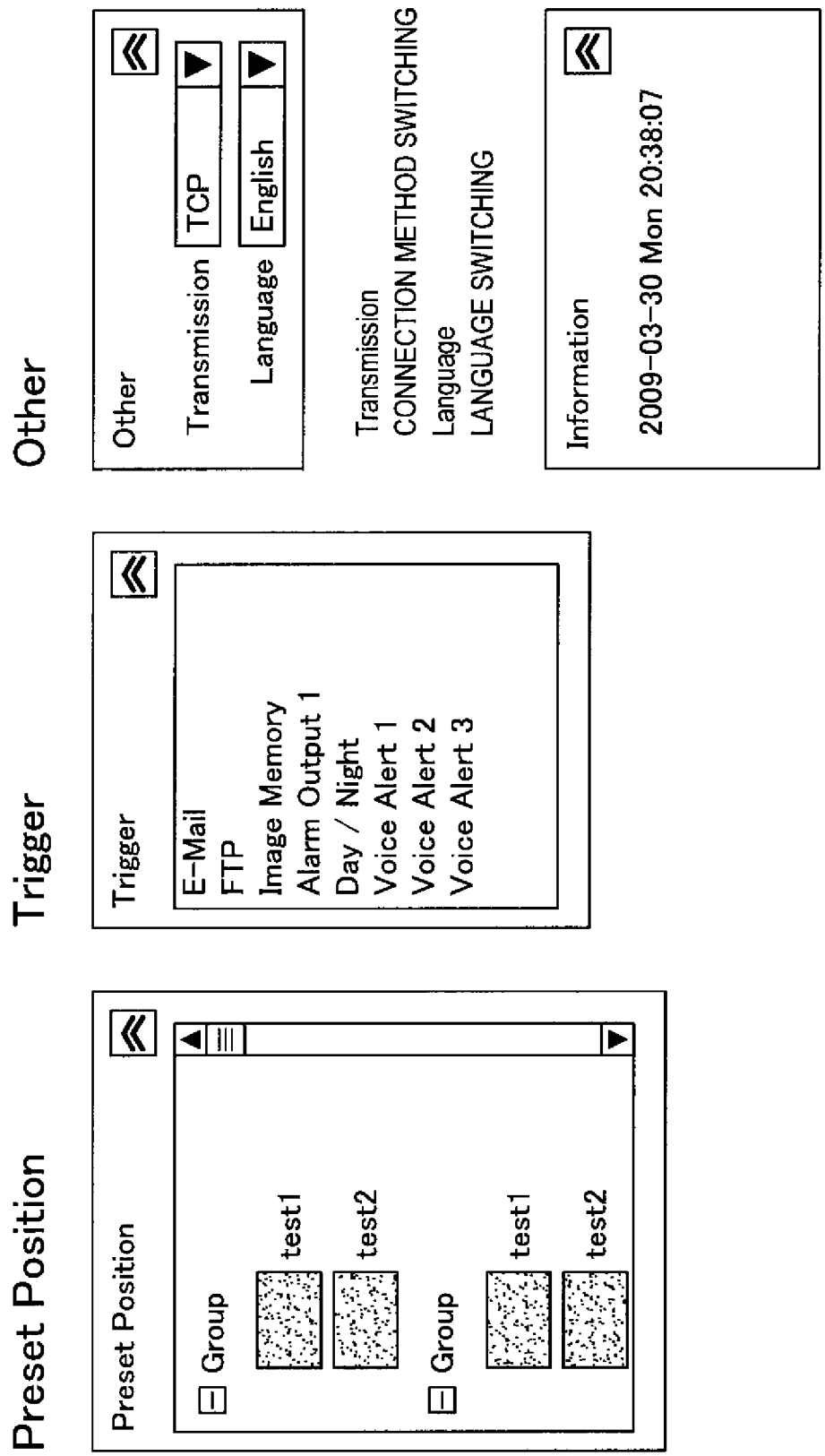
FIG. 13 is a schematic diagram showing each menu displayed when "Preset position," "Trigger," "Other," or "Information" is clicked.

FIG. 13 shows each menu displayed when "Preset position," "Trigger," "Other," or "information" is clicked. "Preset position" is a thumbnail display of images shot in a plurality of predetermined shooting directions. When one of the thumbnail images is clicked and selected, the camera terminal device 200 can be made to face the direction of the selected thumbnail image.

(6) Specifying Shooting Direction on First Panorama Image

Figure 14:
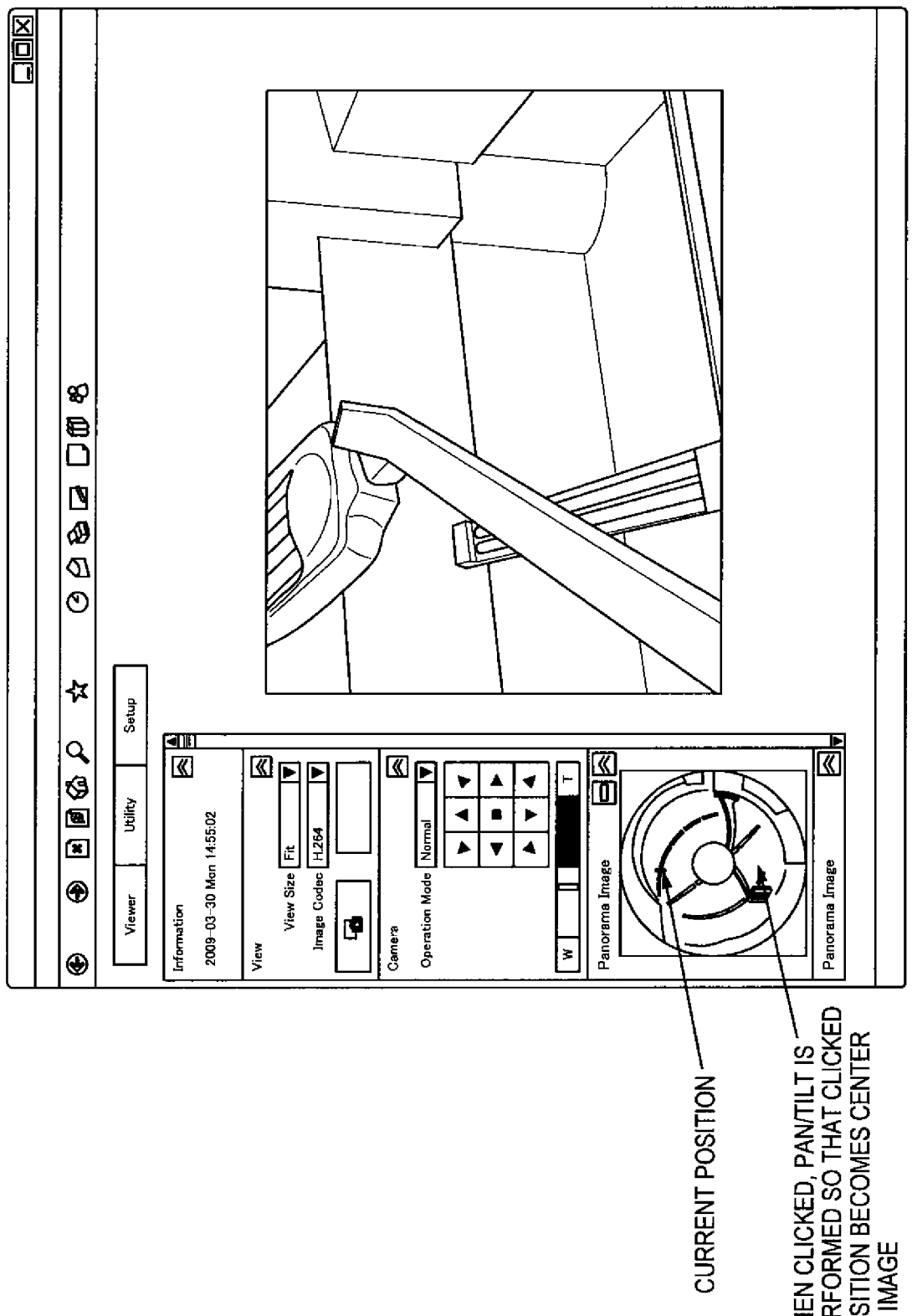
FIG. 14 is a schematic diagram for illustrating a display of a bird's eye image.
Figure 15:
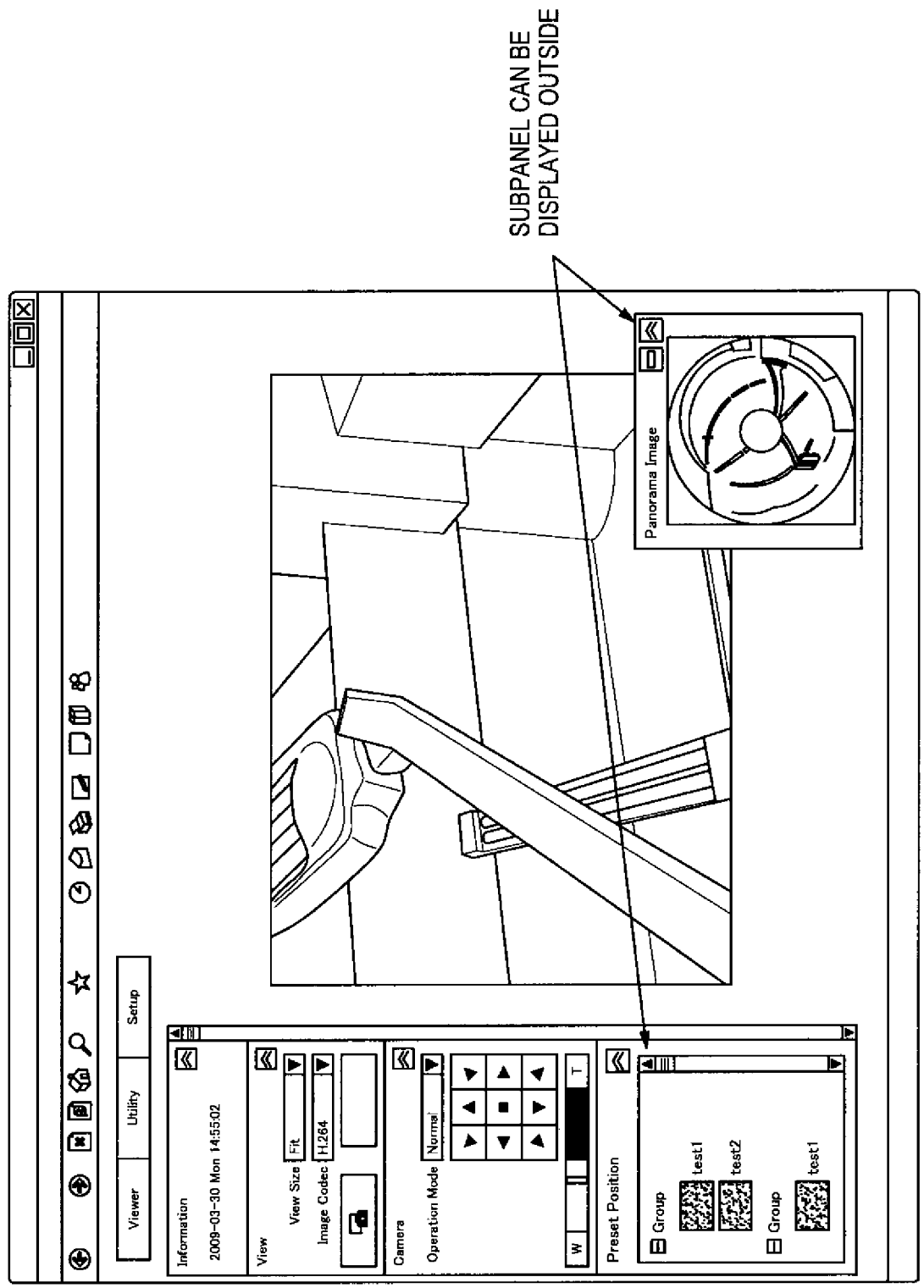
FIG. 15 is a schematic diagram for illustrating a display of a bird's eye image.

Next, a display of the first panorama image will be described with reference to FIG. 14 to FIG. 18. FIG. 14 is a schematic diagram showing a state in which "Preset position" on the operation panel is clicked on the display screen of the monitor 310 so that the first panorama image is displayed. Note that a live video is displayed to the right of the operation panel. As described above, it is possible to arrange a subpanel on which the first panorama image is displayed outside the operation panel as shown in FIG. 15, by moving the "Preset position" field through dragging. In addition, the subpanel on which the first panorama image is displayed can be moved within the display screen.

Figure 16:
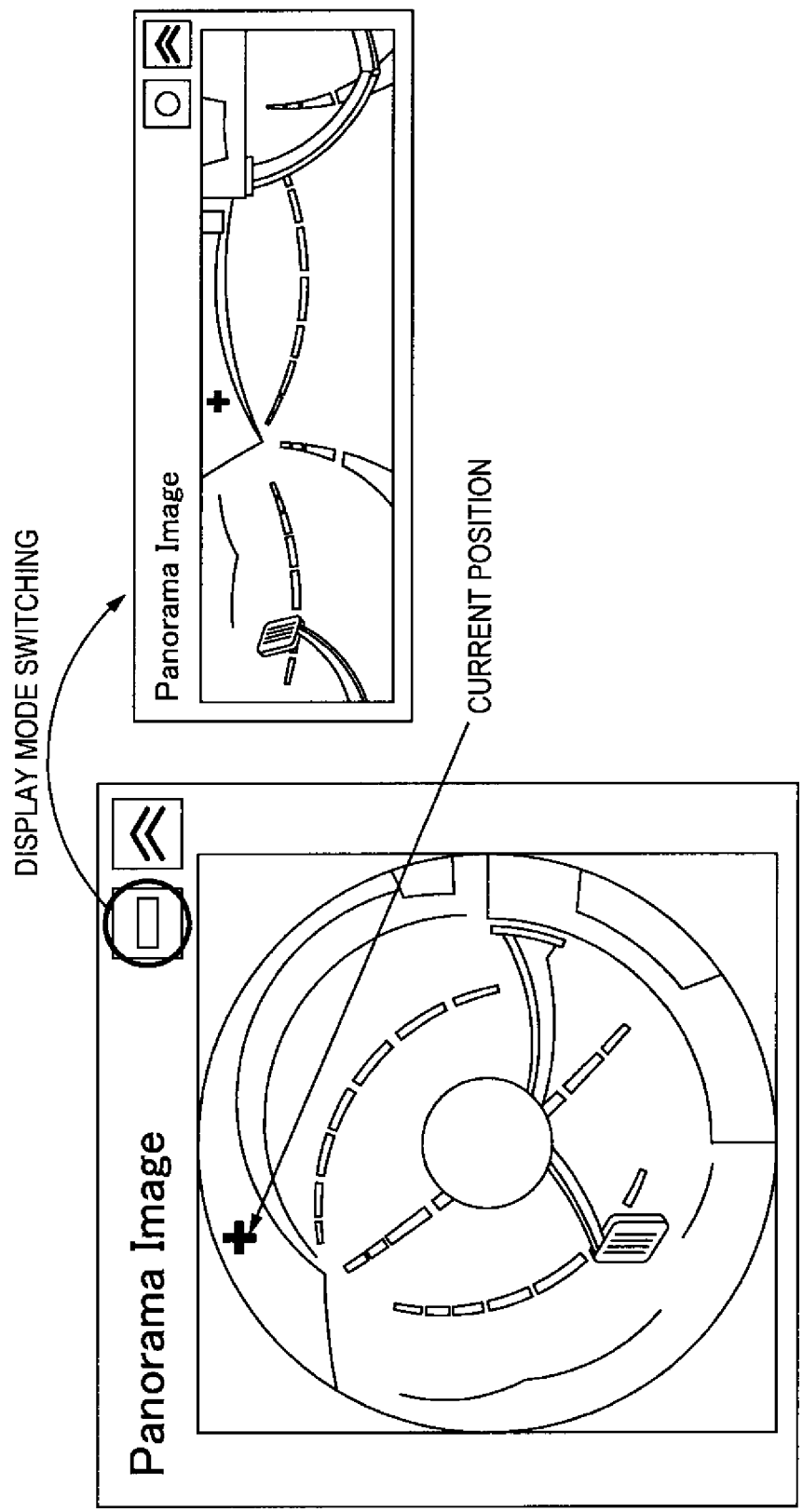
FIG. 16 is a schematic diagram for illustrating a display of a bird's eye image.

FIG. 16 is a schematic diagram showing the details of the subpanel on which the first panorama image is displayed. On the first panorama image, the direction of an image displayed with the live video on the right side (the direction of the optical axis of the imaging optical unit of the camera terminal device 200) is indicated by a + mark. In addition, as shown in FIG. 16, when a panorama switch button on the upper right of the first panorama image is clicked, the first panorama image can be switched to the second panorama image.

Figure 17:
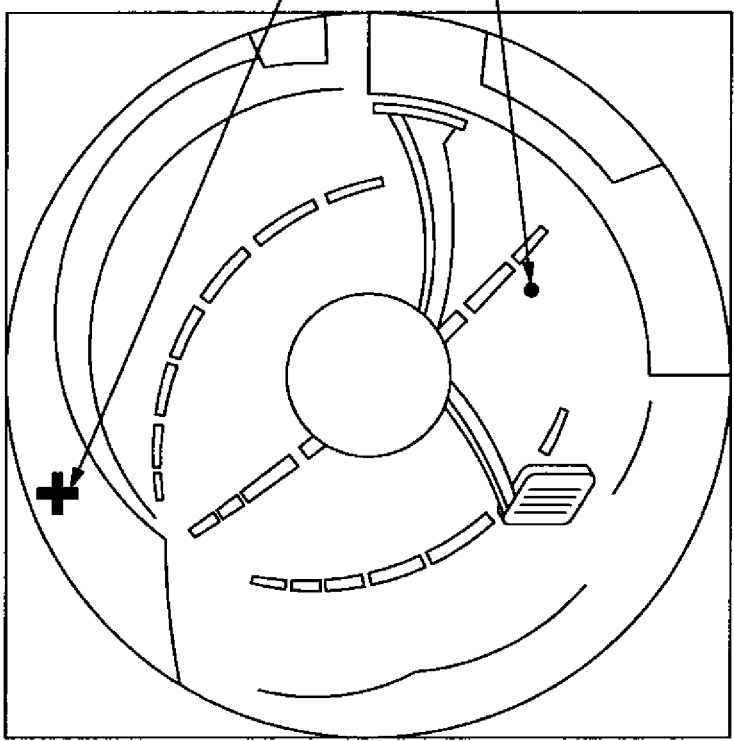
FIG. 17 is a schematic diagram for illustrating a display of a bird's eye image.

FIG. 17 shows an operation of changing the direction of a live video using the first panorama image. When the pan/tilt directions of the camera terminal device 200 are changed, the change can be attained by using the aforementioned pan/tilt control buttons, or by specifying a given point in the first panorama image. In the state of FIG. 17, the optical axis of the imaging optical unit of the camera terminal device 200 is made to face the + mark direction, and a live image in that direction is displayed. In such a state, when a • mark portion shown in the first panorama image of FIG. 17 is clicked, an operation signal US corresponding to the user operation is sent to the control unit 310, and based on this, the imaging direction control unit 204 of the camera terminal device 200 is controlled. Accordingly, the optical axis of the imaging optical unit of the camera terminal device 200 is made to face the • mark direction. Thus, the live video displayed to the right of the operation panel is switched to a video in the • mark direction.

Accordingly, the user is able to specify the pan/tilt directions of the camera terminal device 200 by specifying a given point in the first panorama image. The first panorama image includes videos in all pan/tilt directions that can be shot with the camera terminal device 200. Thus, the user is able to cause a live video in the desired direction to be displayed by specifying the direction of the camera terminal device 200 on the first panorama image. Note that it is also possible to control the optical axis by specifying an area with a frame surrounding a predetermined range, instead of using the + mark indicative of the clicked position.

Figure 18:
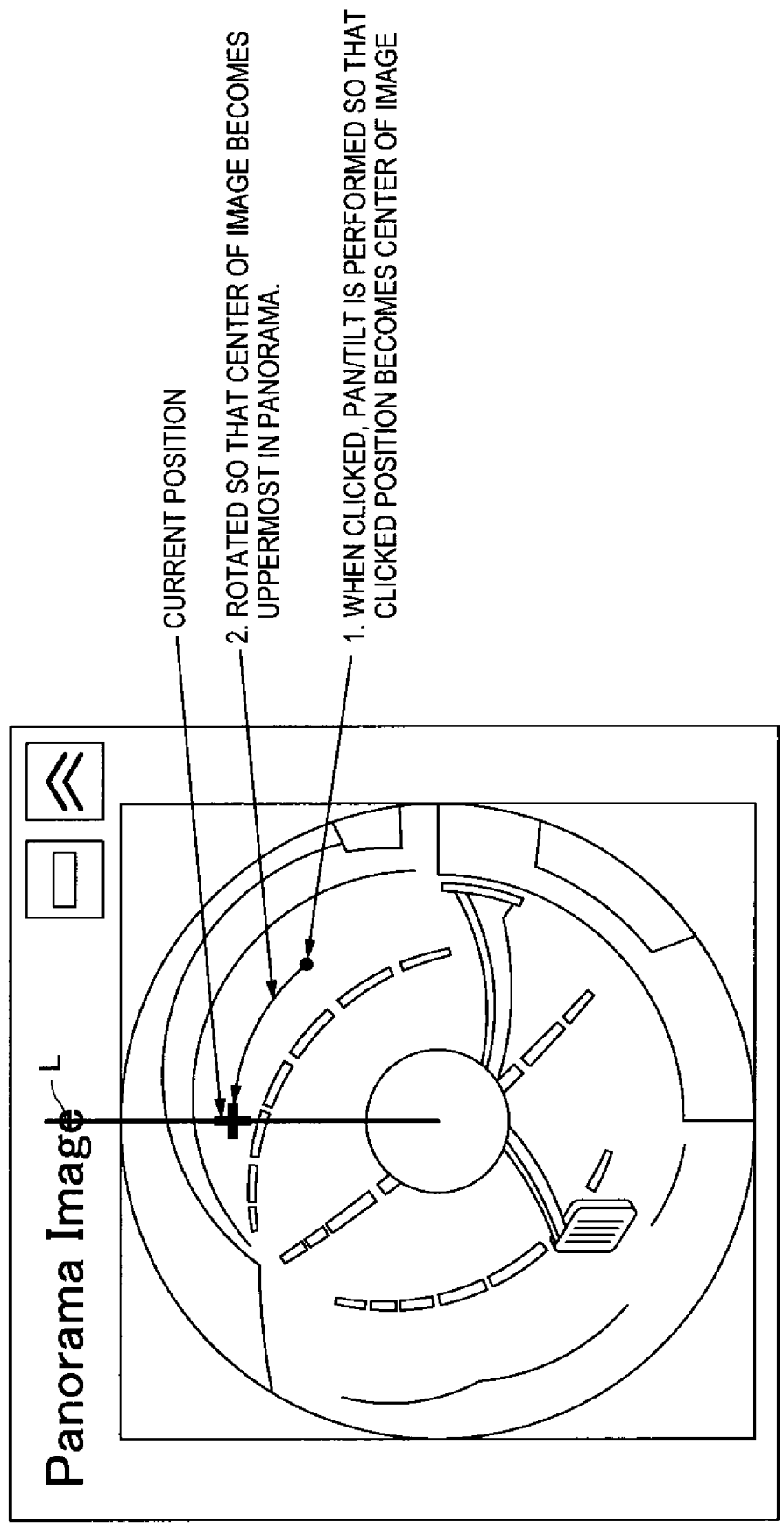
FIG. 18 is a schematic diagram for illustrating a display of a bird's eye image.

When the direction of the camera terminal device 200 is specified on the first panorama image, there are the following modes: a mode in which the display state of the first panorama image is not changed and only a live image is switched, and a mode in which the first panorama image is rotated. In the mode in which the first panorama image is rotated, as shown in FIG. 18, the angular position of the first panorama image is set in such a way that the position (+ mark), for which a live video is currently displayed, is located on a straight line L that extends upward from the center of the first panorama image. Next, when the • mark is clicked on the first panorama image, the live video displayed to the right of the operation panel switches to a video in the • mark direction, and at the same time, the first panorama image is rotated so that the • mark position is located on the straight line L above the first panorama image. Thus, by viewing the first panorama image, the user is able to immediately recognize that the direction of the live video is on the straight line L of the first panorama image.

Likewise, in regard to the second panorama image, the user is able to specify the pan direction of the camera terminal device 200 by specifying a given point in the second panorama image, and based on this, the direction of the live video can be switched.

FIG. 19 shows an example in which, instead of the panorama images such as those shown in FIG. 4, a panorama image displayed on a cylindrical curved plane is used as a reference image. Like this, a rectangular panorama image displayed in the range of +180° to −180° can be displayed on a cylindrical plane. Accordingly, it is possible to enhance the viewability for the user and to display a video in the desired direction. In the case of FIG. 19, the user is also able to specify the pan direction of the camera terminal device 200 by specifying a "display specified point" on the curved plane, and based on this, the direction of a live video can be switched. Note that the aforementioned process including the process of specifying the shooting direction is performed by the display processing unit 305 based on the GUI display control signal CTg.

(7) Effects of Displaying First Panorama Image

Next, effects of displaying the first panorama image will be described with reference to FIG. 20 to FIG. 22. FIG. 20 shows a view in which a "safe" and a "table" are arranged on the floor, and the camera terminal device 200 is disposed immediately above the intermediate position (point O) between the "safe" and the "table." It is assumed that a suspicious person approaching the "safe" can be monitored using a live video obtained with the camera terminal device 200.

Figure 21:
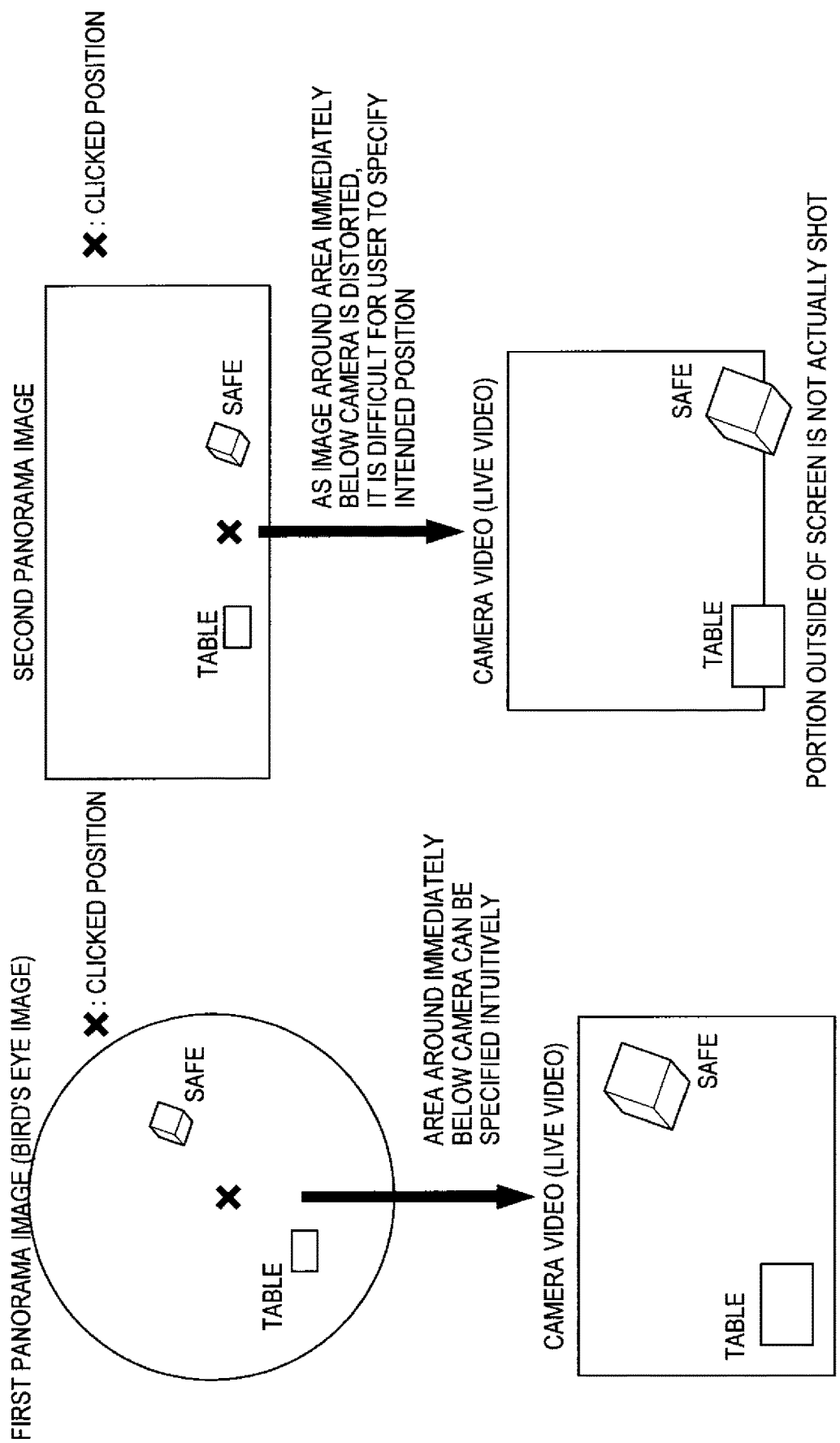

FIG. 21 schematically shows a state in which, in the state of FIG. 20, the first panorama image is displayed together with a live video on the monitor 310 (FIG. 21A) and a state in which the second panorama image is displayed together with a live video on the monitor 310 (FIG. 21B). As has been already described, when a given position on the first panorama image or the second panorama image is clicked, the direction of the optical axis of the camera terminal device 200 can be changed to the clicked position, and the direction in which a live video is shot can also be changed.

As shown in FIG. 21B, in the case of the second panorama image, an image is distorted at a position immediately below the camera terminal device 200, that is, at the intermediate position between the "safe" and the "table." Thus, even when the direction of the optical axis is changed to the clicked position, the direction of the optical axis will not be located at the actual intermediate position (point O shown in FIG. 20) between the "safe" and the "table." That is, when an area around the center between the "safe" and the "table" is to be viewed, if an operation is performed on the second panorama image (the rectangular panorama image), the video will not include the portion that the user originally wishes to view. Thus, intuitive control cannot be performed. For this reason, as shown in FIG. 21B, a circumstance may arise in which a video of the "safe" and the "table" will be outside of the display screen at the bottom side of the live video.

Meanwhile, as shown in FIG. 21A, when an image is displayed in a looked down state, it is possible to intuitively click the intermediate position (point O shown in FIG. 20) between the "safe" and the "table." In addition, as the first panorama image has relatively less distortion of video around the point O, the direction of the optical axis precisely faces the point O. Thus, even on a live video, there is no possibility that a video of the "safe" and the "table" will be outside of the display screen.

FIG. 22 shows a view in which, in the case of FIG. 20 and FIG. 21, a suspicious person is moving around the "safe" in the live video, and the first panorama image and the second panorama image are shown. When a suspicious person is moving around the "safe" in the live video, in order to pursue the suspicious person, it is necessary to change the direction of the optical axis of the camera terminal device 200 in accordance with the movement of the suspicious person.

In such a case, in the case of the second panorama image, the image is distorted at the intermediate position between the "safe" and the "table." Thus, it is necessary to intentionally operate the click position in such a way that the movement direction is changed at a position immediately below the image.

Meanwhile, in the case of the first panorama image, image distortion at the intermediate position between the "safe" and the "table" is small. Thus, it is possible to, by intuitively clicking in accordance with the movement of the suspicious person while viewing the live video, change the direction of the optical axis in accordance with the movement of the suspicious person.

Note that when an area not immediately below the camera terminal device 200 but around the camera terminal device 200 is to be viewed, the second panorama image, which has less distortion, would be able to be controlled more intuitively than the first panorama image. In this embodiment, it is possible to switch between the first panorama image and the second panorama image according to circumstances, which makes it possible to improve the usability for the user according to situations. Further, when there is space in the display screen, it is possible to, by displaying both the first panorama image and the second panorama image, eliminate the need for the switch operation and thus to improve the usability.

According to the aforementioned embodiments, the imaging direction is controlled in such a way that it coincides with the center position in the rectangular panorama image. However, the imaging direction is not limited thereto, and even when the imaging direction is changed, the panorama image can remain fixed without rotation.

Although the preferred embodiments of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

INDUSTRIAL APPLICABILITY

The present invention can be widely applied to, for example, control devices for monitoring cameras, camera systems, or programs.

REFERENCE SIGNS LIST

100 Imaging system
200 Camera terminal device
300 Center server
301 Network interface unit
305 Display processing unit
310 Control unit
500 Network
700 Imaging device
701 Storage unit
704 Image processing unit
705 Display processing unit
710 Control unit

The invention claimed is:

1. A control device, comprising:
a processing circuit configured to generate a birds-eye view image from a plurality of captured images, each captured image of the plurality of captured images being in a different viewing direction;
a control circuit configured to
receive a first selection input to select one of a wide-view image and the birds-eye view image,
control display in a monitoring process, based on the first selection input, of the wide-view image, the birds-eye view image, and a first captured image different from the wide-view image and the birds-eye view image, and
control display in the monitoring process, based on a second selection input, of the wide-view image, and the first captured image, wherein
the viewing direction of the first captured image is changed based on the second selection input,
a viewing angle of the wide-view image is larger than a viewing angle of the first captured image being displayed,
the birds-eye view image is not rotated in response to receipt of the second selection input to change a viewing direction of the first captured image,
the control circuit controls a simultaneous display of the first captured image, the birds-eye view image, and viewing direction information of the first captured image when the birds-eye view image is selected,
the viewing direction information of the first captured image indicates a viewing direction of the first captured image from a center of the birds-eye view image, and
the birds-eye view image is generated from the plurality of captured images including images corresponding to each of selectable viewing directions, the first captured image shows at least a part of an object located around the center of the birds-eye view image, and the first captured image is an image corresponding to one of the plurality of captured images that make up the birds-eye view image.

2. The control device according to claim 1, wherein the control circuit switches, in response to an image switching operation, display of the wide-view image and the birds-eye view image.

3. The control device according to claim 1, wherein the birds-eye view image is a circular image.

4. The control device according to claim 1, wherein the control circuit is configured to control display of the birds-eye view image in a birds-eye view image display area, and to control movement of the birds-eye view image display area on a screen.

5. The control device according to claim 1, wherein the control circuit switches, in response to an image switching operation, a shape of the birds-eye view image between a circular shape and a rectangular shape.

6. A camera system, comprising:
one or more cameras that capture a plurality of images, each of the plurality of captured images being in a different viewing direction;
a processing circuit configured to generate a birds-eye view image from the plurality of captured images; and
a control circuit configured to
receive a first selection input to select one of a wide-view image and the birds-eye view image,
control display in a monitoring process, based on the first selection input, of the wide-view image, the birds-eye view image, and a first captured image different from the wide-view image and the birds-eye view image, and
control display in the monitoring process, based on a second selection input, of the wide-view image, and the first captured image that is based on the second selection input, wherein
the viewing direction of the first captured image is changed based on the second selection input,
a viewing angle of the wide-view image is larger than a viewing angle of the first captured image being displayed, the birds-eye view image is not rotated in response to receipt of the second selection input to change a viewing direction of the first captured image,
the control circuit controls a simultaneous display of the first captured image, the birds-eye view image, and viewing direction information of the first captured image when the birds-eye view image is selected, the viewing direction information of the first captured image indicating a viewing direction of the first captured image from a center of the birds-eye view image,
the birds-eye view image is generated from the plurality of captured images including images corresponding to each of selectable viewing directions, the first captured image shows at least a part of an object located around the center of the birds-eye view image, and the first captured image is an image corresponding to one of the plurality of captured images that make up the birds-eye view image.

7. The camera system according to claim 6, wherein the control circuit switches, in response to an image switching operation, display of the wide-view image and the birds-eye view image.

8. The camera system according to claim 6, wherein the control circuit is configured to control display of the birds-eye view image within a birds-eye view image display area, and to control movement of the birds-eye view image display area on a screen.

9. The camera system according to claim 6, wherein the control circuit switches, in response to an image switching operation, a shape of the birds-eye view image between a circular shape and a rectangular shape.

10. A non-transitory computer readable medium storing computer readable instructions that, when executed by a computer including at least a processing circuit and a control circuit, cause the computer to:
generate a birds-eye view image from a plurality of captured images, each captured image of the plurality of captured images being in a different viewing direction;
receive a first selection input to select one of a wide-view image and the birds-eye view image;
control display in a monitoring process, based on the first selection input, of the wide-view image, the birds-eye view image, and a first captured image different from the wide-view image and the birds-eye view image; and
control display in the monitoring process, based on a second selection input, of the wide-view image, and the first captured image that is based on the second selection input and different from the wide-view image and the birds-eye view image, wherein
the viewing direction of the first captured image is changed based on the second selection input,
a viewing angle of the wide-view image is larger than a viewing angle of the first captured image being displayed, the birds-eye view image is not rotated in response to receiving the second selection input to change a viewing direction of the first captured image, the computer is caused to control a simultaneous display of the first captured image, the birds-eye view image and viewing direction information of the first captured image when the birds-eye view image is selected, the viewing direction information of the first captured image indicating a viewing direction of the first captured image from a center of the birds-eye view image, and the birds-eye view image is generated from the plurality of captured images including images corresponding to each of selectable viewing directions, the first captured image shows at least a part of an object located around the center of the birds-eye view image, and the first captured image is an image corresponding to one of the plurality of captured images that make up the birds-eye view image.

11. A method for a camera control device, the method comprising:

generating, by a processing circuit of the camera control device, a birds-eye view image from a plurality of captured images, each captured image of the plurality of captured images being in a different viewing direction;

receiving, by a control circuit of the camera control device, a first selection input to select one of a wide-view image and the birds-eye view image;

controlling display in a monitoring process, by the control circuit and based on the first selection input, of the wide-view image, the birds-eye view image, and a first captured image different from the wide-view image and the birds-eye view image; and controlling display in the monitoring process, by the control circuit and based on a second selection input, of the wide-view image, and the first captured image that is based on the second selection input and different from the wide-view image and the birds-eye view image, wherein the viewing direction of the first captured image is changed based on the second selection input, a viewing angle of the wide-view image is larger than a viewing angle of the first captured image being displayed, the birds-eye view image is not rotated in response to receiving the second selection input to change a viewing direction of the first captured image, a simultaneous display of the first captured image, the birds-eye view image and viewing direction information of the first captured image is controlled by the control circuit when the birds-eye view image is selected, the viewing direction information of the first captured image indicating a viewing direction of the first captured image from a center of the birds-eye view image, the birds-eye view image is generated from the plurality of captured images including images corresponding to each of selectable viewing directions, the first captured image shows at least a part of an object located around the center of the birds-eye view image, and the first captured image is an image corresponding to one of the plurality of captured images that make up the birds-eye view image.

12. The control device according to claim 1, wherein the control circuit is further configured to control display of a mark within the birds-eye view image, the mark indicating a position of a camera that captured the plurality of captured images.

13. The control device according to claim 1, wherein the first captured image is a live video feed.

14. The method according to claim 11, further comprising:

controlling, by the control circuit, display of the birds-eye view image within a birds-eye view image display area; and controlling movement of the birds-eye view image display area on a screen.

15. The control device according to claim 1, wherein the control circuit generates the birds-eye view image in response to a request for the birds-eye view image.

16. The control device according to claim 1, wherein the control circuit is further configured to control display of a mark within the birds-eye view image, the mark indicating a position of a camera that captured the plurality of captured images, and the first captured image is a live video feed.

* * * * *